US011267293B2

(12) United States Patent
Yamakawa

(10) Patent No.: US 11,267,293 B2
(45) Date of Patent: Mar. 8, 2022

(54) PNEUMATIC TIRE

(71) Applicant: The Yokohama Rubber Co., LTD., Tokyo (JP)

(72) Inventor: Takahiro Yamakawa, Hiratsuka (JP)

(73) Assignee: The Yokohama Rubber Co., LTD.

( * ) Notice: Subject to any disclaimer, the term of this patent is extended or adjusted under 35 U.S.C. 154(b) by 463 days.

(21) Appl. No.: 16/070,710

(22) PCT Filed: Feb. 9, 2017

(86) PCT No.: PCT/JP2017/004823
§ 371 (c)(1),
(2) Date: Jul. 17, 2018

(87) PCT Pub. No.: WO2017/138623
PCT Pub. Date: Aug. 17, 2017

(65) Prior Publication Data
US 2019/0023080 A1     Jan. 24, 2019

(30) Foreign Application Priority Data

Feb. 10, 2016 (JP) .............................. JP2016-023545

(51) Int. Cl.
*B60C 11/11* (2006.01)
*B60C 11/12* (2006.01)
(Continued)

(52) U.S. Cl.
CPC .......... *B60C 11/1218* (2013.01); *B60C 11/01* (2013.01); *B60C 11/03* (2013.01);
(Continued)

(58) Field of Classification Search
CPC ......... B60C 2011/1227; B60C 11/0309; B60C 11/11; B60C 2011/0358; B60C 2011/1295; B60C 2011/0353
See application file for complete search history.

(56) References Cited

U.S. PATENT DOCUMENTS

| 6,892,775 | B1 | 5/2005 | Himuro | |
|---|---|---|---|---|
| 2002/0005236 | A1* | 1/2002 | Minami | B60C 11/11 152/209.2 |

(Continued)

FOREIGN PATENT DOCUMENTS

| CN | 102883894 | 1/2013 |
|---|---|---|
| CN | 104249603 | 12/2014 |

(Continued)

OTHER PUBLICATIONS

Fujita JP2010208419 English Translation (Year: 2010).*

(Continued)

*Primary Examiner* — Jacob T Minskey
*Assistant Examiner* — Adrien J Bernard
(74) *Attorney, Agent, or Firm* — Thorpe North & Western

(57) ABSTRACT

A pneumatic tire includes at least four circumferential main grooves that extend in a tire circumferential direction; and at least five land portions defined by the circumferential main grooves. The center land portion and the left and right second land portions each include through lug grooves that are inclined at a predetermined inclination angle with respect to the tire lateral direction and extend through the land portion in the tire lateral direction. The through lug grooves located in the center land portion and the through lug grooves located in the left and right second land portions extend in the tire lateral direction inclined in opposite directions to each other. At least one groove wall of each of the through lug grooves located in the left and right second land portions include a step-shaped bent portion that bends in the tire circumferential direction in a plan view of a tread.

21 Claims, 10 Drawing Sheets

(51) Int. Cl.
  *B60C 11/01* (2006.01)
  *B60C 11/03* (2006.01)
(52) U.S. Cl.
  CPC ........... *B60C 11/0309* (2013.01); *B60C 11/11* (2013.01); *B60C 2011/0341* (2013.01); *B60C 2011/0358* (2013.01); *B60C 2011/1295* (2013.01); *B60C 2200/04* (2013.01)

(56) References Cited

U.S. PATENT DOCUMENTS

| | | |
|---|---|---|
| 2002/0170643 A1 | 11/2002 | Kuze |
| 2012/0325384 A1 | 12/2012 | Ochi |
| 2015/0273951 A1 | 10/2015 | Yamakawa |
| 2015/0298508 A1 | 10/2015 | Yamakawa et al. |
| 2017/0057296 A1 | 3/2017 | Takemori |
| 2017/0239997 A1 | 8/2017 | Nishino |
| 2018/0022162 A1 | 1/2018 | Takemori |

FOREIGN PATENT DOCUMENTS

| | | | | |
|---|---|---|---|---|
| CN | 104822543 | 8/2015 | | |
| CN | 104837653 | 8/2015 | | |
| DE | 11 2015 003 720 | 5/2017 | | |
| JP | H11-342708 | 12/1999 | | |
| JP | 3718021 | 11/2005 | | |
| JP | 3894743 | 3/2007 | | |
| JP | 4316452 | 8/2009 | | |
| JP | 2010-208419 | 9/2010 | | |
| JP | 2586628 | * 5/2013 | ............ | B60C 11/03 |
| JP | 2014/177236 | 9/2014 | | |
| JP | WO2015083474 | * 6/2015 | ......... | B60C 11/0306 |
| WO | WO 2011/111352 | 9/2011 | | |
| WO | WO 2014/136500 | 9/2014 | | |
| WO | WO 2014/136883 | 9/2014 | | |
| WO | WO 2015/166802 | 11/2015 | | |
| WO | WO 2016/024443 | 2/2016 | | |
| WO | WO 2016/121874 | 8/2016 | | |

OTHER PUBLICATIONS

Yamakawa WO2014136500 English Translation (Year: 2014).*
Numata WO2015083474 English Translation (Year: 2015).*
International Search Report for International Application No. PCT/JP2017/004823 dated May 16, 2017, 4 pages, Japan.

* cited by examiner

| | | CONVENTIONAL EXAMPLE | EXAMPLE 1 | EXAMPLE 2 | EXAMPLE 3 | EXAMPLE 4 | EXAMPLE 5 |
|---|---|---|---|---|---|---|---|
| THROUGH LUG GROOVE INCLINATION ANGLE | CE-2ND | OPPOSITE SIGNS | OPPOSITE SIGNS | OPPOSITE SIGNS | OPPOSITE SIGNS | OPPOSITE SIGNS | OPPOSITE SIGNS |
| | 2ND-SH | SAME SIGN | OPPOSITE SIGNS | OPPOSITE SIGNS | OPPOSITE SIGNS | OPPOSITE SIGNS | OPPOSITE SIGNS |
| LUG GROOVE SHAPE | CE | STRAIGHT LINE | STEP | STEP | STEP | STEP | STEP |
| | 2ND | ARC | STEP | STEP | STEP | STEP | STEP |
| | SH | ARC | STEP | STEP | STEP | STEP | STEP |
| NUMBER OF BLOCK SHAPE TYPES | CE | 1 | 2 | 2 | 2 | 2 | 2 |
| | 2ND | 1 | 2 | 2 | 2 | 2 | 2 |
| | SH | 1 | 1 | 1 | 1 | 1 | 1 |
| LUG GROOVE INCLINATION ANGLE (DEG) | CE | 40 | $\theta 11=\theta 12=10$ | $\theta 11=13$ $\theta 12=10$ | $\theta 11=20$ $\theta 12=10$ | $\theta 11=30$ $\theta 12=10$ | $\theta 11=20$ $\theta 12=10$ |
| | 2ND | 50 | $\theta 21=\theta 22=28$ | $\theta 21=\theta 22=28$ | $\theta 21=\theta 22=28$ | $\theta 21=\theta 22=28$ | $\theta 21=33$ $\theta 22=28$ |
| | SH | 15 | 8 | 8 | 8 | 8 | 8 |
| $\theta 11-\theta 12$ (DEG) | | 0 | 0 | 3 | 10 | 20 | 10 |
| $\theta 21-\theta 22$ (DEG) | | 0 | 0 | 0 | 0 | 0 | 5 |
| LUG GROOVE GROOVE WIDTH (MAXIMUM WIDTH) (mm) | CE | 4.0 | Wg11= Wg12=4.0 | Wg11= Wg12=4.0 | Wg11= Wg12=4.0 | Wg11= Wg12=4.0 | Wg11= Wg12=4.0 |
| | 2ND | 7.0 | Wg21_t= Wg22_t=8.0 | Wg21_t= Wg22_t=8.0 | Wg21_t= Wg22_t=8.0 | Wg21_t= Wg22_t=8.0 | Wg21_t= Wg22_t=8.0 |
| | SH | 7.0 | 7.0 | 7.0 | 7.0 | 7.0 | 7.0 |
| Wg12/Wg11 | | - | 1.00 | 1.00 | 1.00 | 1.00 | 1.00 |
| CE NOTCH PORTION | | NO | NO | NO | NO | NO | NO |
| SH NON-THROUGH LUG GROOVE | | NO | NO | NO | NO | NO | NO |
| SNOW PERFORMANCE | | 100 | 103 | 103 | 104 | 104 | 105 |
| NOISE PERFORMANCE | | 100 | 101 | 103 | 104 | 105 | 105 |

FIG. 10A

| | | EXAMPLE 6 | EXAMPLE 7 | EXAMPLE 8 | EXAMPLE 9 | EXAMPLE 10 | EXAMPLE 11 | EXAMPLE 12 |
|---|---|---|---|---|---|---|---|---|
| THROUGH LUG GROOVE INCLINATION ANGLE | CE-2ND | OPPOSITE SIGNS | OPPOSITE SIGNS | OPPOSITE SIGNS | OPPOSITE SIGNS | OPPOSITE SIGNS | OPPOSITE SIGNS | OPPOSITE SIGNS |
| | 2ND-SH | OPPOSITE SIGNS | OPPOSITE SIGNS | OPPOSITE SIGNS | OPPOSITE SIGNS | OPPOSITE SIGNS | OPPOSITE SIGNS | OPPOSITE SIGNS |
| LUG GROOVE SHAPE | CE | STEP | STEP | STEP | STEP | STEP | STEP | STEP |
| | 2ND | STEP | STEP | STEP | STEP | STEP | STEP | STEP |
| | SH | STEP | STEP | STEP | STEP | STEP | STEP | STEP |
| NUMBER OF BLOCK SHAPE TYPES | CE | 2 | 2 | 2 | 2 | 2 | 2 | 2 |
| | 2ND | 2 | 2 | 2 | 2 | 2 | 2 | 2 |
| | SH | 1 | 1 | 1 | 1 | 1 | 1 | 1 |
| LUG GROOVE INCLINATION ANGLE (DEG) | CE | θ11=20 θ12=10 | θ11=20 θ12=10 | θ11=20 θ12=10 | θ11=20 θ12=10 | θ11=20 θ12=10 | θ11=20 θ12=10 | θ11=20 θ12=10 |
| | 2ND | θ21=45 θ22=28 | θ21=68 θ22=28 | θ21=45 θ22=28 | θ21=45 θ22=28 | θ21=45 θ22=28 | θ21=45 θ22=28 | θ21=45 θ22=28 |
| | SH | 8 | 8 | 8 | 8 | 8 | 8 | 8 |
| θ11-θ12 (DEG) | | 10 | 10 | 10 | 10 | 10 | 10 | 10 |
| θ21-θ22 (DEG) | | 17 | 40 | 17 | 17 | 17 | 17 | 17 |
| LUG GROOVE GROOVE WIDTH (MAXIMUM WIDTH) (mm) | CE | Wg11= Wg12=4.0 | Wg11= Wg12=4.0 | Wg11=3.6 Wg12=4.0 | Wg11=3.5 Wg12=4.0 | Wg11=1.4 Wg12=4.0 | Wg11=3.5 Wg12=4.0 | Wg11=3.5 Wg12=4.0 |
| | 2ND | Wg21_t= Wg22_t=8.0 | Wg21_t= Wg22_t=8.0 | Wg21_t= Wg22_t=8.0 | Wg21_t= Wg22_t=8.0 | Wg21_t= Wg22_t=8.0 | Wg21_t= Wg22_t=8.0 | Wg21_t= Wg22_t=8.0 |
| | SH | 7.0 | 7.0 | 7.0 | 7.0 | 7.0 | 7.0 | 7.0 |
| Wg12/Wg11 | | 1.00 | 1.00 | 1.12 | 1.14 | 2.80 | 1.14 | 1.14 |
| CE NOTCH PORTION | | NO | NO | NO | NO | NO | YES | YES |
| SH NON-THROUGH LUG GROOVE | | NO | NO | NO | NO | NO | NO | YES |
| SNOW PERFORMANCE | | 106 | 106 | 105 | 105 | 104 | 107 | 109 |
| NOISE PERFORMANCE | | 106 | 107 | 107 | 108 | 109 | 109 | 108 |

FIG. 10B

PNEUMATIC TIRE

TECHNICAL FIELD

The technology relates to a pneumatic tire and particularly relates to a pneumatic tire that can provide improved snow performance.

BACKGROUND ART

All-season tires for a passenger vehicle and tires for a light truck employ a block pattern with a plurality of block rows to improve the snow performance of the tire. An example of such a known pneumatic tire is the technology described in Japan Patent No. 3718021.

SUMMARY

The technology provides a pneumatic tire that can provide improved snow performance.

A pneumatic tire according to an embodiment of the technology includes:

at least four circumferential main grooves that extend in a tire circumferential direction; and at least five land portions defined by the circumferential main grooves;

the land portions including land portions located outermost in a tire lateral direction on left and right sides defined as shoulder land portions, land portions located second from outside in the tire lateral direction on left and right sides defined as second land portions, and a land portion located closer to a tire equatorial plane than the second land portions defined as a center land portion;

the center land portion and the left and right second land portions each including a plurality of through lug grooves that are inclined at a predetermined inclination angle with respect to the tire lateral direction and extend through the land portion in the tire lateral direction;

the plurality of through lug grooves located in the center land portion and the plurality of through lug grooves located in the left and right second land portions extending in the tire lateral direction inclined in opposite directions to each other; and at least one groove wall of each of the plurality of through lug grooves located in the left and right second land portions including a step-shaped bent portion that bends in the tire circumferential direction when a tread is seen in a plan view.

In a pneumatic tire according to an embodiment of the technology, (1) the through lug grooves of the center land portion and the through lug grooves of the left and right second land portions are inclined in opposite directions. This improves the traction characteristics on snowy road surfaces when the vehicle is turning. Additionally, (2) the through lug grooves located in the left and right second land portions include a groove wall with a step-shaped bent portion. This increases the edge components of the through lug groove in the tread portion center region. This has the advantage of the snow performance of the tire being improved.

BRIEF DESCRIPTION OF DRAWINGS

FIGS. 10A-10B include a table showing the results of performance tests of pneumatic tires according to embodiments of the technology.

DETAILED DESCRIPTION

Embodiments of the technology are described in detail below with reference to the drawings. However, the technology is not limited to these embodiments. Moreover, constituents of the embodiments include elements that are substitutable while maintaining consistency with the technology, and obviously substitutable elements. Furthermore, the modified examples described in the embodiments can be combined as desired within the scope apparent to those skilled in the art.

Pneumatic Tire

Figure 1:
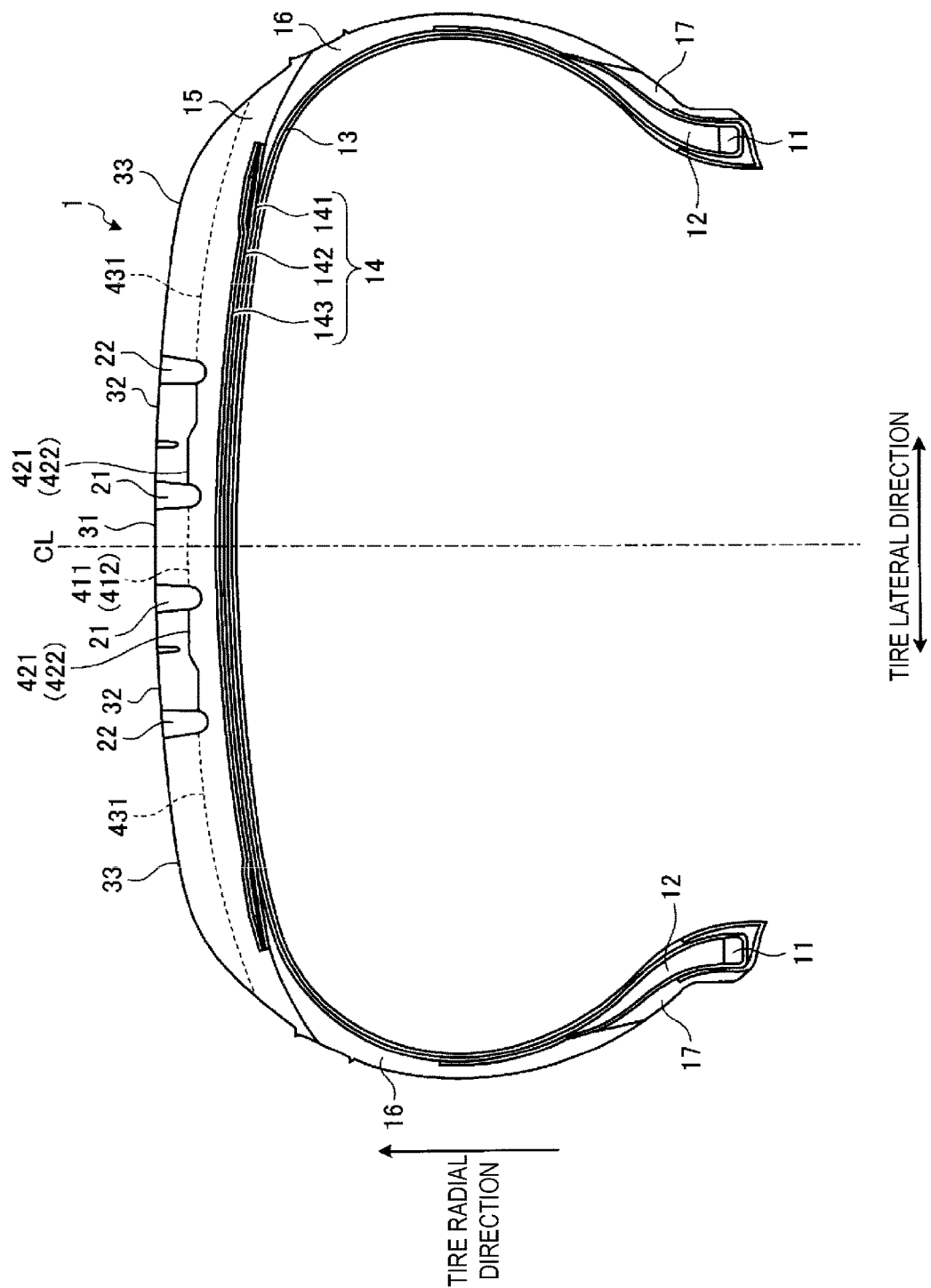
FIG. 1 is a cross-sectional view in a tire meridian direction illustrating a pneumatic tire according to an embodiment of the technology.

FIG. 1 is a cross-sectional view in a tire meridian direction illustrating a pneumatic tire according to an embodiment of the technology. The same drawing is a cross-sectional view of a half region in the tire radial direction. Also, the same drawing illustrates a radial tire for a passenger vehicle as an example of a pneumatic tire.

In reference to the same drawing, "cross section in a tire meridian direction" refers to a cross section of the tire taken along a plane that includes the tire rotation axis (not illustrated). Also, reference sign CL denotes the tire equatorial plane and refers to a plane normal to the tire rotation axis that passes through the center point of the tire in the tire rotation axis direction. Moreover, "Tire lateral direction" refers to the direction parallel with the tire rotation axis. "Tire radial direction" refers to the direction perpendicular to the tire rotation axis.

The pneumatic tire 1 has an annular structure with the tire rotation axis as its center and includes a pair of bead cores 11, 11, a pair of bead fillers 12, 12, a carcass layer 13, a belt layer 14, a tread rubber 15, a pair of sidewall rubbers 16, 16, and a pair of rim cushion rubbers 17, 17 (see FIG. 1).

The pair of bead cores 11, 11 are annular members constituted by a plurality of bead wires bundled together. The pair of bead cores 11, 11 constitute the cores of the left and right bead portions. The pair of bead fillers 12, 12 are each disposed outward of the pair of bead cores 11, 11 in the tire radial direction and constitute the bead portions.

The carcass layer 13 has a single layer structure made of one carcass ply or a multilayer structure made of a plurality of carcass plies, and extends between the left and right bead cores 11, 11 in a toroidal shape, forming the framework of the tire. Additionally, both end portions of the carcass layer 13 are turned back outwardly in the tire lateral direction so as to wrap around the bead cores 11 and the bead fillers 12 and fixed. Besides, the carcass ply (plies) of the carcass layer 13 is made by a process of covering a plurality of carcass cords made of steel or an organic fiber material (e.g., aramid, nylon, polyester, rayon, or the like) with a coating rubber and then a rolling process. The carcass ply (plies) has a carcass angle (inclination angle of the fiber direction of the carcass cords with respect to the tire circumferential direction), as an absolute value, ranging from 80 degrees to 95 degrees.

The belt layer 14 is a multilayer structure including a pair of cross belts 141, 142 and a belt cover 143 and is disposed around the outer circumference of the carcass layer 13. The pair of cross belts 141, 142 are made by a process of covering a plurality of belt cords made of steel or an organic fiber material with a coating rubber and then a rolling process. The cross belts 141, 142 have a belt angle, as an absolute value, ranging from 20 degrees to 55 degrees. Furthermore, the pair of cross belts 141, 142 have belt angles (inclination angle of the fiber direction of the belt cords with respect to the tire circumferential direction) of opposite signs, and the belts are layered so that the fiber directions of the belt cords intersect each other (crossply structure). The belt cover 143 is made by a process of covering a plurality of cords made of steel or an organic fiber material with a coating rubber and then a rolling process. The belt cover 143 has a belt angle, as an absolute value, ranging from 0 to 10 degrees. In addition, the belt cover 143 is disposed in a layered manner outward of the cross belts 141, 142 in the tire radial direction.

The tread rubber 15 is disposed outward of the carcass layer 13 and the belt layer 14 in the tire radial direction and constitutes a tread portion. The pair of sidewall rubbers 16, 16 are disposed outward of the carcass layer 13 in the tire lateral direction and constitute left and right sidewall portions. The pair of rim cushion rubbers 17, 17 are disposed inward of the left and right bead cores 11, 11 and the turned back portions of the carcass layer 13 in the tire radial direction. The pair of rim cushion rubbers 17, 17 constitute the contact surfaces of the left and right bead portions with the rim flanges.

Tread Pattern

Figure 2:
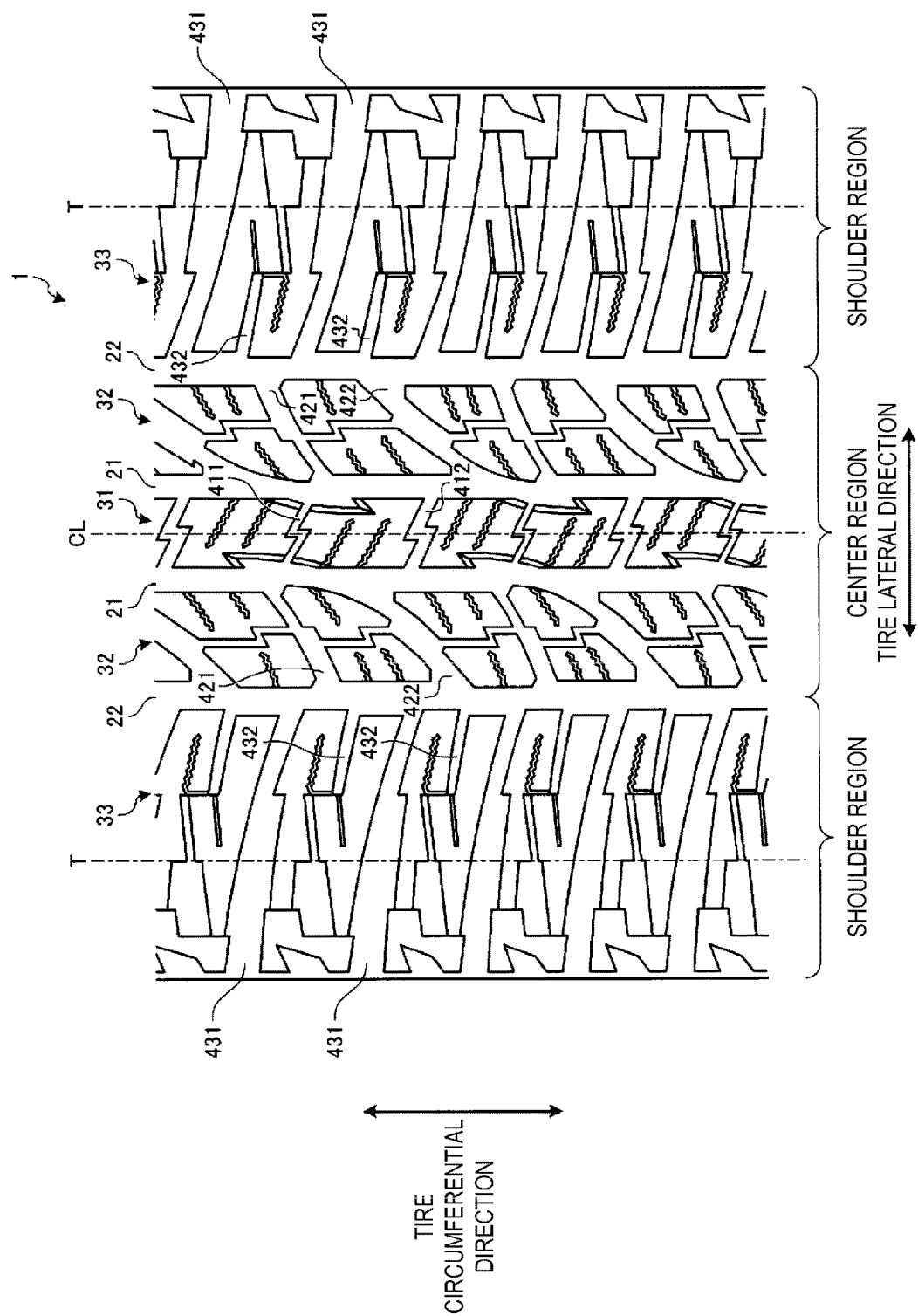
FIG. 2 is a plan view illustrating a tread pattern of the pneumatic tire illustrated in FIG. 1.

FIG. 2 is a plan view illustrating a tread pattern of the pneumatic tire illustrated in FIG. 1. The same drawing illustrates a tread pattern for an all-season tire. In reference to the same drawing, "tire circumferential direction" refers to the direction revolving about the tire rotation axis. Moreover, reference sign T denotes a tire ground contact edge.

As illustrated in FIG. 2, the pneumatic tire 1 is provided with, in the tread portion, a plurality of circumferential main grooves 21, 22 extending in the tire circumferential direction, a plurality of land portions 31 to 33 defined by the circumferential main grooves 21, 22, and a plurality of lug grooves 411, 412, 421, 422, 431, 432 disposed in the land portions 31 to 33.

"Circumferential main groove" refers to a circumferential groove with a wear indicator that indicates the terminal stage of wear and typically has a groove width of 5.0 mm or greater and a groove depth of 7.5 mm or greater. Moreover, "lug groove" refers to a lateral groove having a groove width of 2.0 mm or greater and a groove depth of 3.0 mm or greater. Additionally, "sipe", which is described below, refers to a cut formed in a land portion that typically has a sipe width of less than 1.5 mm.

The groove width is the maximum distance between the left and right groove walls at the groove opening portion and is measured when the tire is mounted on a specified rim, inflated to the specified internal pressure, and in an unloaded state. In configurations in which the land portions include notch portions or chamfered portions on the edge portions thereof, the groove width is measured with reference to the points where the tread contact surface and extension lines of the groove walls meet, when viewed in a cross-section normal to the groove length direction. Additionally, in configuration in which the grooves extend in a zigzag-like or wave-like manner in the tire circumferential direction, the groove width is measured with reference to the center line of the amplitude of the groove walls.

The groove depth is the maximum distance from the tread contact surface to the groove bottom and is measured when the tire is mounted on a specified rim, inflated to the specified internal pressure, and in an unloaded state. Additionally, in configurations in which the grooves include a ridged/grooved portion or sipes on the groove bottom, the groove depth is measured excluding these portions.

"Specified rim" refers to an "applicable rim" defined by the Japan Automobile Tyre Manufacturers Association Inc. (JATMA), a "Design Rim" defined by the Tire and Rim Association, Inc. (TRA), or a "Measuring Rim" defined by the European Tyre and Rim Technical Organisation (ETRTO). Additionally, "specified internal pressure" refers to a "maximum air pressure" defined by JATMA, to the maximum value in "TIRE LOAD LIMITS AT VARIOUS COLD INFLATION PRESSURES" defined by TRA, and to "INFLATION PRESSURES" defined by ETRTO. Additionally, "specified load" refers to a "maximum load capacity" defined by JATMA, the maximum value in "TIRE LOAD LIMITS AT VARIOUS COLD INFLATION PRESSURES" defined by TRA, and a "LOAD CAPACITY" defined by ETRTO. However, in the case of JATMA, for a passenger vehicle tire, the specified internal pressure is an air pressure of 180 kPa, and the specified load is 88% of the maximum load capacity.

For example, in the configuration of FIG. 2, the pneumatic tire 1 includes a tread pattern with left-right point symmetry about a point on the tire equatorial plane CL. Additionally, the four circumferential main grooves 21, 22 are disposed having left-right symmetry about the tire equatorial plane CL. Additionally, five land portions 31 to 33 are defined by the four circumferential main grooves 21, 22. One land portion 31 is disposed on the tire equatorial plane CL.

However, the configuration is not limited to such and five or more circumferential main grooves may be disposed (not illustrated). Additionally, the circumferential main grooves 21, 22 may be disposed having left-right asymmetry about the tire equatorial plane CL (not illustrated). Additionally, a circumferential main groove may be disposed on a tire equatorial plane CL (not illustrated). Therefore, the land portion 31 may be disposed at a position off the tire equatorial plane CL.

In the configuration of FIG. 2, the four circumferential main grooves 21, 22 have an overall straight shape, and the edge portions of the left and right land portions 31 to 33 project into the circumferential main grooves 21, 22 forming the groove walls of the circumferential main grooves 21, 22 in a step-shape in the tire circumferential direction.

However, no such limitation is intended, and the circumferential main grooves 21, 22 may have a purely straight shape or a zigzag shape or a wave-like shape that bends or curves while extending in the tire circumferential direction (not illustrated).

Here, the left and right circumferential main grooves 22, 22 located outermost in the tire lateral direction are referred to as outermost circumferential main grooves. Additionally, a tread portion center region and a tread portion shoulder region are defined by the left and right outermost circumferential main grooves 22, 22.

Furthermore, of the plurality of land portions 31 to 33 defined by the circumferential main grooves 21, 22, the land portion 33 on the outermost side in the tire lateral direction is defined as a shoulder land portion. A shoulder land portion 33 is an outer land portion in the tire lateral direction defined by the outermost circumferential main groove 22, and a tire ground contact edge T is located on the tread surface of the shoulder land portion 33. Additionally, the second land portion 32 from the outside in the tire lateral direction is defined as a second land portion. The second land portion 32 is an inner land portion in the tire lateral direction defined by the outermost circumferential main groove 22 and is adjacent to the shoulder land portion 33 with the outermost circumferential main groove 22 located therebetween. Furthermore, the land portion 31 located closer to the tire equatorial plane CL than the second land portion 32 is defined as a center land portion. The center land portion 31 may be disposed on the tire equatorial plane CL (FIG. 2) or may be disposed at a position off the tire equatorial plane CL (not illustrated).

Moreover, in the configuration of FIG. 2, each of the land portions 31 to 33 include the plurality of lug grooves 411, 412; 421, 422; 431, 432, respectively, that extend in the tire lateral direction. Additionally, at least one of the lug grooves 411, 412; 421, 422; 431 is a through lug groove that extends through the respective land portion 31; 32; 33 in the tire lateral direction and is also arranged at predetermined intervals in the tire circumferential direction. Accordingly, each of the land portions 31 to 33 is divided in the tire circumferential direction by the lug grooves 411, 412; 421, 422; 431 and formed as a block row including a plurality of blocks.

However, no such limitation is intended, and, for example, each of the lug grooves 431, 432 of the shoulder land portion 33 may be a non-through lug groove that terminates within the shoulder land portion 33 at one end portion (not illustrated). In such an embodiment, the shoulder land portion 33 is a rib that is continuous in the tire circumferential direction.

Arrangement Structure of Through Lug Groove

All-season tires for a passenger vehicle and tires for a light truck employ a block pattern with a plurality of block rows to improve the snow performance of the tire. However, such a block pattern tends to have increased pattern noise and degraded noise performance.

Accordingly, the pneumatic tire 1 uses the following configuration in order to provide good snow performance and noise performance in a compatible manner.

Figure 3:
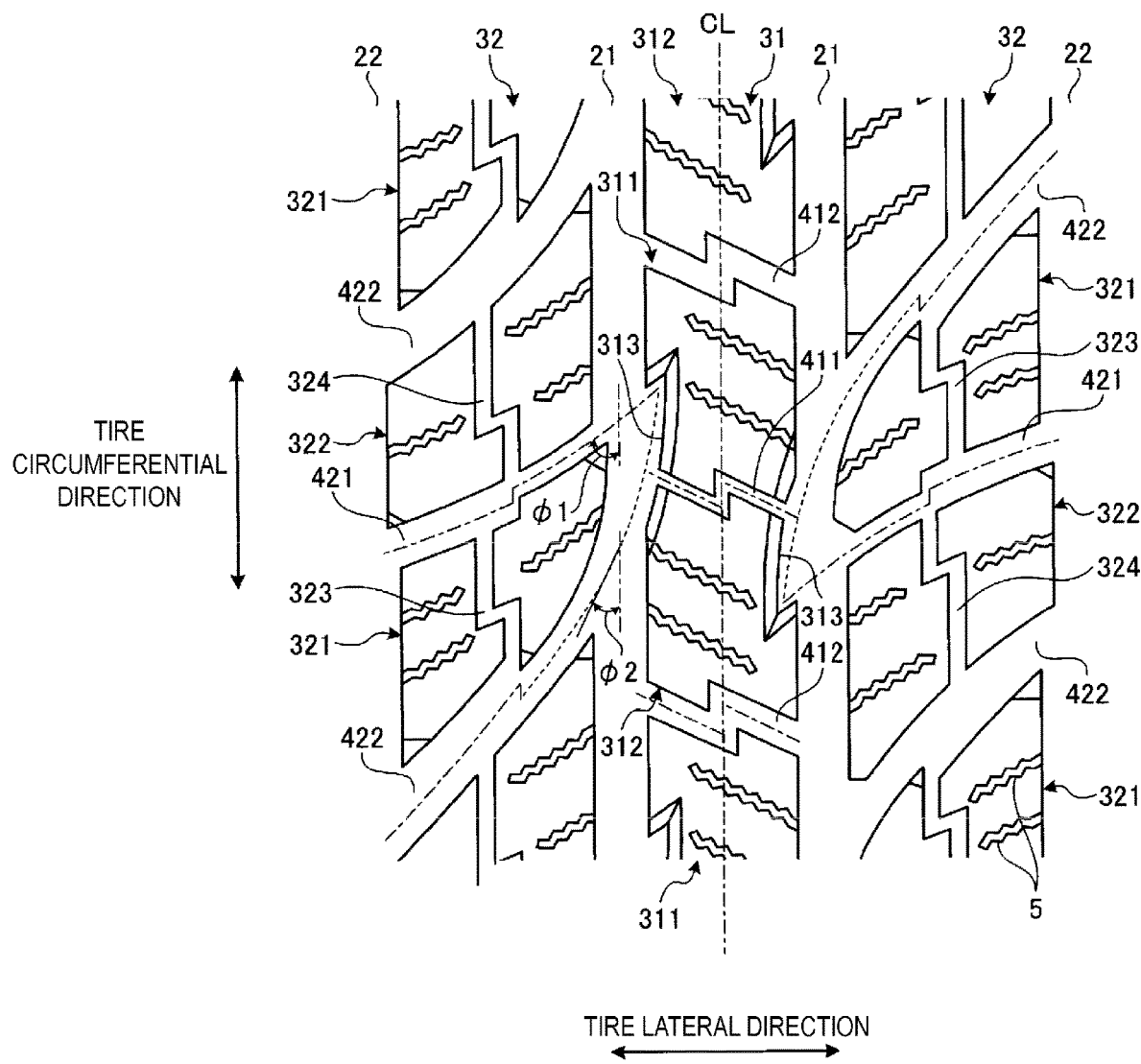
FIG. 3 is an enlarged view illustrating a center region of the tread pattern illustrated in FIG. 2.

FIG. 3 is an enlarged view illustrating a center region of the tread pattern illustrated in FIG. 2. In the same drawing, in particular, the arrangement structure of the through lug grooves 411, 412 of the center land portion 31 and the through lug grooves 421, 422 of the second land portion 32 is illustrated in a simplified manner.

As illustrated in FIG. 3, the center land portion 31 and the left and right second land portions 32, 32 are provided with the plurality of through lug grooves 411, 412; 421, 422 that extend through the land portion 31; 32 in the tire lateral direction. The through lug grooves 411, 412; 421, 422 divide the center land portion 31 and the left and right second land portions 32, 32 in the tire circumferential direction to form block rows. This increases traction characteristics on snowy road surfaces (shear force in snow) and the snow performance (in particular, driving performance) of the tire.

Moreover, the through lug grooves 411, 412; 421, 422 of the center land portion 31 and the second land portions 32, 32 are inclined at a predetermined inclination angle (dimension symbol omitted in the drawing) with respect to the tire lateral direction. Additionally, the through lug grooves 411, 412; 421, 422 have an inclination angle with an absolute value preferably ranging from 5 degrees to 70 degrees, more preferably ranging from 10 degrees to 60 degrees, and more preferably ranging from 20 degrees to 48 degrees. Additionally, the absolute value of the inclination angle of the through lug grooves 411, 412 of the center land portion 31 is preferably less than the absolute value of the through lug grooves 421, 422 of the left and right second land portions 32, 32 by a difference of 15 degrees or greater.

The inclination angle of the through lug grooves in the center land portion and the second land portions is measured as an angle formed by an imaginary line that joins center points of the through lug groove at opening portions to the left and right circumferential main grooves and the tire rotation axis. Additionally, the inclination angle of the through lug grooves in the shoulder land portion is measured as an angle formed by an imaginary line that joins center points of the through lug groove at opening portions at the outermost circumferential main groove and the tire ground contact edge and the tire rotation axis.

Here, the through lug grooves 411, 412 located in the center land portion 31 and the through lug grooves 421, 422 located in the left and right second land portions 32 extend in the tire lateral direction inclined in opposite directions. Additionally, the through lug grooves 421, 422 located in the left and right second land portions 32, 32 are inclined in the same direction as each other. This increases traction characteristics on snowy road surfaces when the vehicle is turning and the snow performance (in particular, turning performance) of the tire.

In the configuration of FIG. 2, as described above for example, the five land portions 31 to 33 are each provided with a plurality of the through lug grooves 411, 412; 421, 422, 431, respectively, that are inclined at a predetermined inclination angle with respect to the tire lateral direction. The through lug grooves 411, 412, 431 of the center land portion 31 and the left and right shoulder land portions 33, 33 and the through lug grooves 421, 422 of the left and right second land portions 32, 32 extend in the tire lateral direction inclined in opposite directions to each other. Furthermore, the through lug grooves 411, 412 of the center land portion 31 and the through lug grooves 431 of the shoulder land portions 33 are inclined in the same direction as each other. Moreover, the through lug grooves 411, 412 of the left and right second land portions 32, 32 are inclined in the same direction as each other. Additionally, the through lug grooves of adjacent pairs of the land portions 31, 32; 32, 33 have opposite orientations in each pair. Accordingly, in the tread pattern overall, the through lug grooves 411, 412; 421, 422, 431 are arranged in a zigzag manner in the tire lateral direction. This further increases traction characteristics on snowy road surfaces when the vehicle is turning.

As illustrated in FIG. 2, the positions of opening portions of the through lug grooves 411, 412, 421, 422; 421, 422, 431 of adjacent pairs of the land portions 31, 32; 32, 33 to the circumferential main grooves 21, 22 are offset from one another in the tire circumferential direction. Thus, the through lug grooves 411, 412, 421, 422; 421, 422, 431 of the adjacent pairs of the land portions 31, 32; 32, 33 are discontinuously disposed and not disposed on an extension line of a groove center line of one another. This further increases traction characteristics on snowy road surfaces.

Different Block Type Arrangement Structure

Figure 4:
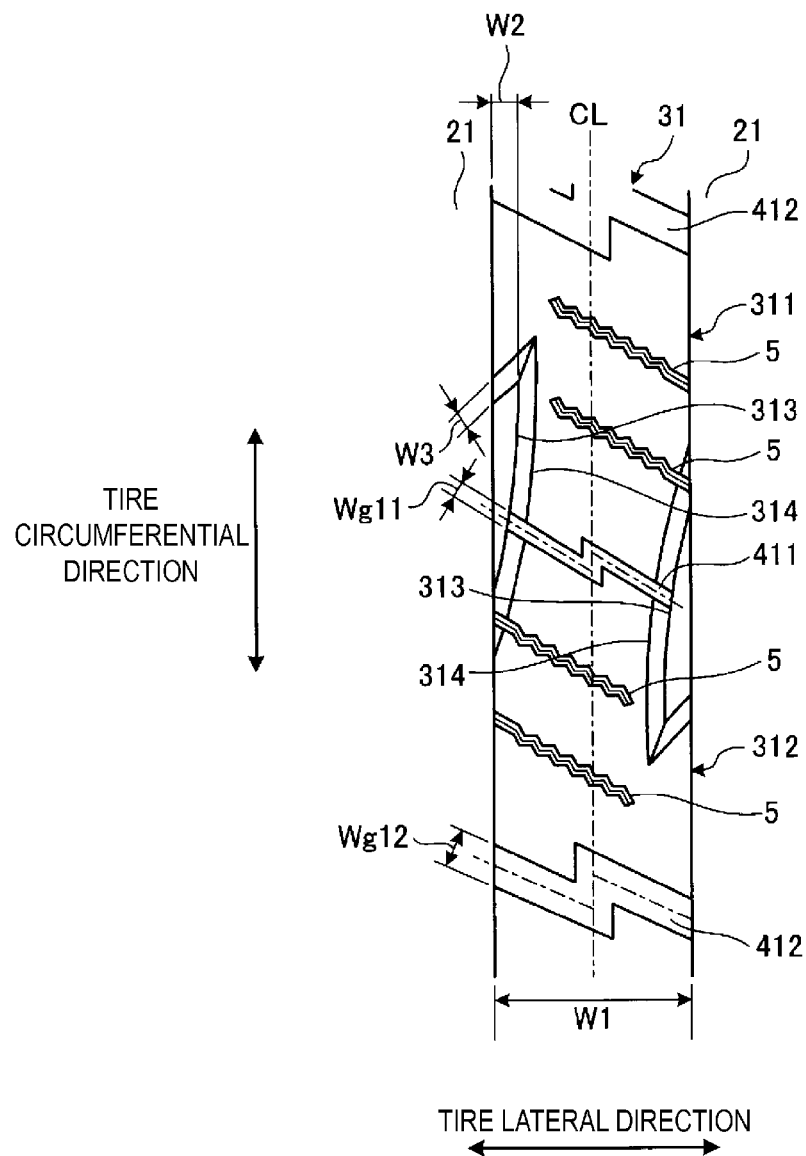
FIG. 4 is an enlarged view illustrating a center land portion of the tread pattern illustrated in FIG. 2.
Figure 5:
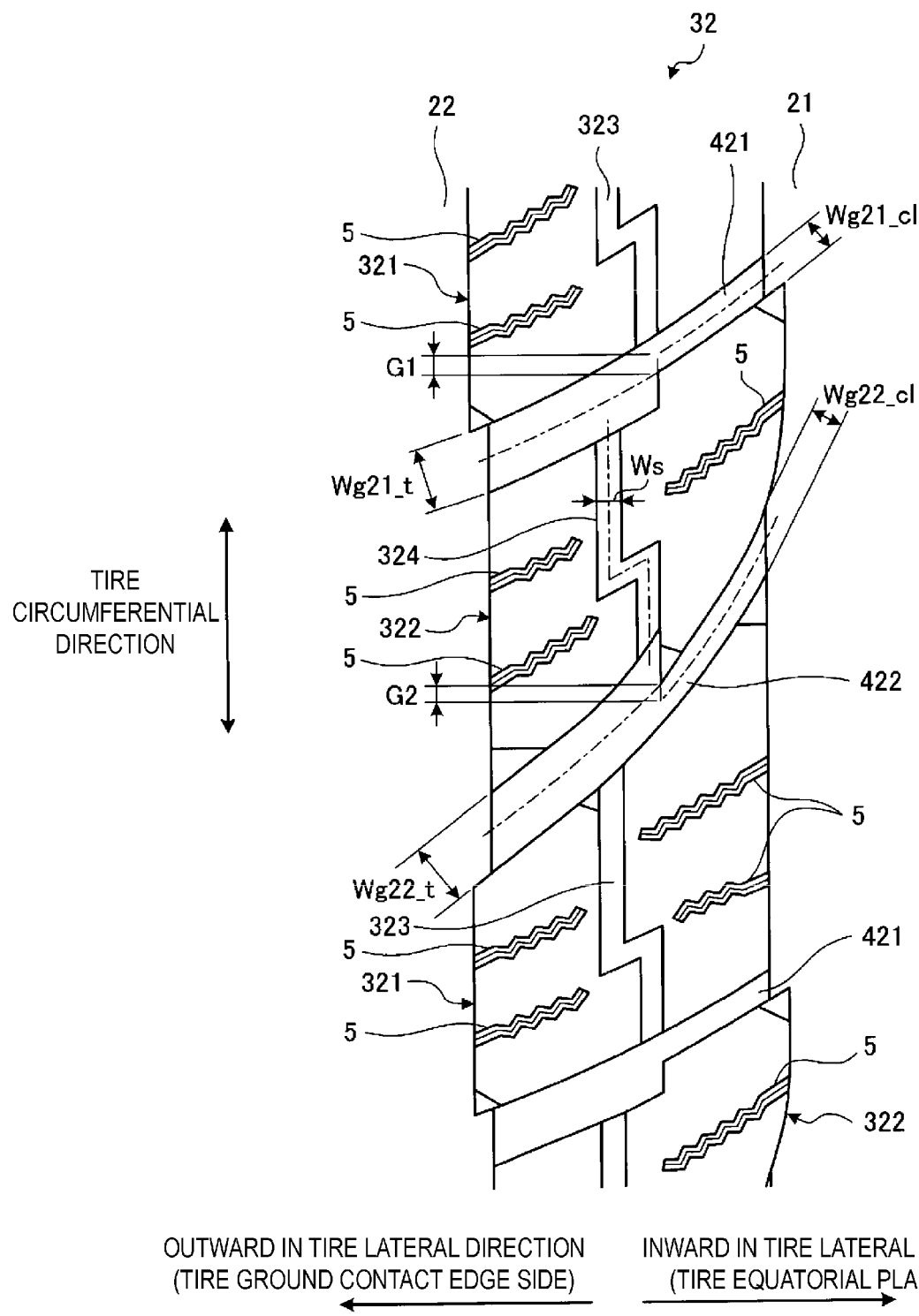
FIG. 5 is an enlarged view illustrating a second land portion of the tread pattern illustrated in FIG. 2.
Figure 6:
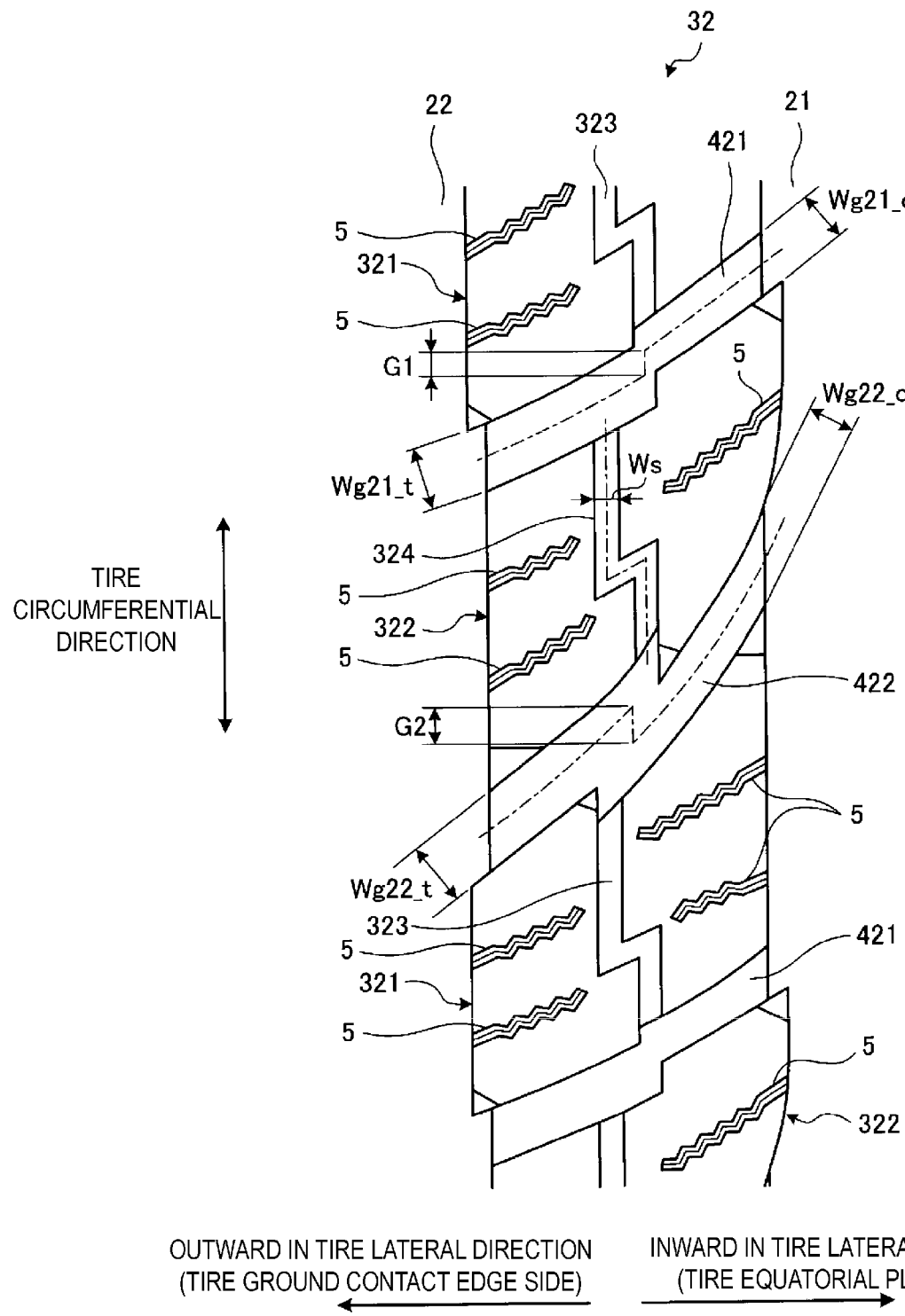
FIG. 6 is an explanatory diagram illustrating a modified example of the second land portion illustrated in FIG. 5.

FIG. 4 is an enlarged view illustrating the center land portion of the tread pattern illustrated in FIG. 2. FIG. 5 is an enlarged view illustrating the second land portion of the tread pattern illustrated in FIG. 2. FIG. 6 is an explanatory diagram illustrating a modified example of the second land portion illustrated in FIG. 5.

As illustrated in FIGS. 2 and 3, the center land portion 31 and the left and right second land portions 32, 32 are provided with a plurality of types of through lug grooves 411, 412; 421, 422; and a plurality of types of blocks 311, 312; 321, 322 (see FIG. 3) defined by the through lug grooves 411, 412; 421, 422. Additionally, a plurality of types of through lug grooves 411, 412; 421, 422 are arranged periodically in the tire circumferential direction. Also, the plurality of types of blocks 311, 312; 321, 322 have different shapes. The plurality of types of blocks 311, 312; 321, 322 form a set as one block unit, and a plurality of these blocks units are repeatedly arranged around the entire circumference of the tire. In such a configuration, the land portions 31, 32 of the tread portion center region are each provided with a block row including the plurality of types of blocks 311, 312; 321, 322. This reduces pattern noise dependent on the block shape when the tire rolls. In this way, the noise performance of the tire (in particular, cabin noise performance) is improved.

The number of types of through lug grooves and blocks described above is from two to three.

Furthermore, tread pattern of the pneumatic tire 1 may overall have a variable pitch structure with the pitch arrangement varying in the tire circumferential direction, and the circumferential length of the blocks of the land portions 31 to 33 may vary periodically in the tire circumferential direction. Accordingly, in the center land portion 31 and the left and right second land portions 32, 32, the circumferential length of a block unit including a set of a plurality of types of blocks 311, 312; 321, 322 described above varies periodically in the tire circumferential direction due to the variable pitch structure described above. This effectively reduces pattern noise when the tire rolls.

For example, in the configuration of FIG. 4, the center land portion 31 is provided with two types of through lug grooves 411, 412. These through lug grooves 411, 412 are alternately disposed in the tire circumferential direction (see FIG. 2). Additionally, the through lug grooves 411, 412 adjacent in the tire circumferential direction include different inclination angles θ11, θ12 (dimension symbol omitted in the drawing). Moreover, the two types of blocks 311, 312 defined by the through lug grooves 411, 412 are alternately arranged in the tire circumferential direction. Furthermore, the blocks 311, 312 adjacent in the tire circumferential direction have different shapes from each other. Also, the blocks 311, 312 have a profile shape with point symmetry with respect to each other.

In addition, an edge portion of the first block 311 closer to one of the circumferential main grooves 22 (right side of FIG. 4) is longer in the tire circumferential direction than an edge portion closer to the other circumferential main groove 21 (left side of FIG. 4). Alternatively, an edge portion of the second block 312 closer to one of the circumferential main grooves 22 (right side of FIG. 4) is shorter than an edge portion closer to the other circumferential main groove 21 (left side of FIG. 4). Thus, looking at just the edge portion of the center land portion 31 on one side, the longer edge portion and the shorter edge portion are alternately disposed in the tire circumferential direction.

Furthermore, the two types of through lug grooves 411, 412 are inclined in the same direction with respect to the tire lateral direction. Additionally, the inclination angle θ11 of the narrower first through lug groove 411 is greater than the inclination angle θ12 of the wider second through lug groove 412 (θ12<θ11). The difference between the inclination angles θ11, θ12 is preferably in the range of 3 degrees≤θ11−θ12≤20 degrees, and more preferably in the range of 5 degrees≤θ11−θ12≤10 degrees. This ensures the difference θ11−θ12 between the inclination angles θ11, θ12 of the adjacent through lug grooves 411, 412, and ensures a reduction effect of pattern noise when the tire rolls. Additionally, the difference in rigidity or the difference in edge length between the blocks 311, 312; 321, 322 adjacent in the tire circumferential direction is reduced, and the uneven wear of the block is suppressed.

Moreover, a groove width Wg11 of the narrower first through lug groove 411 and a groove width Wg12 of the wider second through lug groove 412 preferably have the relationship of 1.10≤Wg12/Wg11≤3.00, and more preferably have the relationship of 1.30≤Wg12/Wg11≤2.00. In this way, the ratio Wg12/Wg11 of the groove widths Wg11, Wg12 of the adjacent through lug grooves 411, 412 is appropriately set.

Note that the groove width Wg12 of the wider second through lug groove 412 can be selected as appropriate depending on the tire size. For a typical all-season tire for a passenger vehicle or a light truck, the groove width Wg12 of the wider second through lug groove 412 may be within the range 3.8 mm≤Wg12≤5.3 mm.

As illustrated in FIG. 4, the through lug grooves 411, 412 of the center land portion 31 include a step-shaped bent portion when the tread is seen in a plan view. Specifically, the left and right groove walls of the through lug grooves 411, 412 of the center land portion 31 both include a step-shaped bent portion that bends in the tire circumferential direction at a central region of the blocks 311, 312 in the tire lateral direction (a region in a third of the block width). In addition, the bent portions of the through lug grooves 411, 412 have a Z-shape or a crank-like shape when the tread is seen in a plan view. The left and right groove walls of the through lug grooves 411, 412 are disposed parallel with each other, giving the through lug grooves 411, 412 a substantially constant groove width. In such a configuration, the through lug grooves 411, 412 includes more edge components than in a configuration in which the lug grooves have a straight shape. This improves the snow performance of the tire.

The step-shaped bent portion is defined by a first groove wall portion, a second groove wall portion disposed offset with respect to the first groove wall portion in the tire circumferential direction, and a circumferential groove wall portion that extends in the tire circumferential direction and connects the first groove wall portion and the second groove wall portion. Additionally, an angle (dimension symbol omitted in the drawing) formed by the wall surface of the circumferential groove wall portion and the tire circumferential direction preferably ranges from 80 degrees to 100 degrees, and more preferably ranges from 85 degrees to 95 degrees.

Also, in the configuration of FIG. 4, the through lug grooves 411, 412 includes only a single bent portion. However, no such limitation is intended, and the through lug grooves 411, 412 may include a plurality of bent portions (not illustrated). Additionally, in the FIG. 4, the groove walls of the through lug grooves 411, 412 have an overall linear shape excluding the bent portion. However, no such limitation is intended, and the groove walls of the through lug grooves 411, 412 may have an overall arced or curved shape like the through lug grooves 421, 422 (see FIG. 5) of the second land portion 32 described below.

Furthermore, in the configuration of FIG. 4, the through lug grooves 411, 412 of the center land portion 31 have the groove widths Wg11, Wg12, respectively which are constant across the entire region in the groove length direction. However, no such limitation is intended, and for example, the through lug grooves 411, 412 may increase in width at the opening portion to the circumferential main groove 21, making the groove widths Wg11, Wg12 of the through lug grooves 411, 412 vary in the groove length direction (not illustrated).

In a similar manner, in the configuration of FIG. 5, the left and right second land portions 32, 32 are provided with two types through lug grooves 421, 422. These through lug grooves 421, 422 are alternately disposed in the tire circumferential direction (see FIG. 2). Additionally, the through lug grooves 421, 422 adjacent in the tire circumferential direction include different inclination angles θ21, θ22 (dimension symbol omitted in the drawing). Furthermore, the two types of blocks 321, 322 defined by the through lug grooves 421, 422 are alternately arranged in the tire circumferential direction. Thus, the blocks 321, 322 adjacent in the tire circumferential direction have different shapes from each other.

The adjacent through lug grooves 421, 422 have different inclination angles from each other. Thus, the left and right edge portions of the blocks 321, 322 closer to the circumferential main grooves 21, 22 have different circumferential lengths from each other. In addition, the edge portion of one of the adjacent blocks 321 closer to the tire equatorial plane CL is longer in the tire circumferential direction than the edge portion closer to the tire ground contact edge T. Conversely, the edge portion of the other block 322 closer to the tire equatorial plane CL is shorter in the tire circumferential direction than the edge portion closer to the tire ground contact edge T in the tire circumferential direction. Thus, looking at just the edge portion of the second land portion 32 on one side, the longer edge portion and the shorter edge portion are alternately disposed in the tire circumferential direction. Moreover, the edge portions of the adjacent blocks 321, 322 are disposed offset in the tire lateral direction such that the shorter edge portion projects into the respective circumferential main groove 21, 22 further than the longer edge portion in both the left and right circumferential main grooves.

Additionally, the two types of through lug grooves 421, 422 are inclined in the same direction with respect to the tire lateral direction (in FIG. 5, upward toward the tire equatorial plane). Additionally, the inclination angle θ21 of the through lug groove 421 is greater than the inclination angle θ22 of the through lug groove 422 (θ22<θ21). The difference between the inclination angles θ21, θ22 is preferably in the range of 5 degrees≤θ21−θ22≤40 degrees, and more preferably in the range of 10 degrees≤θ21−θ22≤20 degrees. This ensures the difference θ21−θ22 between the inclination angles θ21, θ22 of the adjacent through lug grooves 421, 422, and ensures a reduction effect of pattern noise when the tire rolls. Additionally, the difference in rigidity or the difference in edge length between the blocks 311, 312; 321, 322 adjacent in the tire circumferential direction is reduced, and the uneven wear of the block is suppressed.

Besides, as illustrated in FIG. 5, the blocks 321, 322 of the second land portion 32 include a single circumferential narrow groove 323, 324. Additionally, the circumferential narrow grooves 323, 324 have a bent shape with an amplitude in the tire lateral direction and extend through the blocks 321, 322 in the tire circumferential direction and open to the adjacent through lug grooves 421, 422 respectively. Accordingly, the blocks 321, 322 are divided in the tire lateral direction, and the ground contact patch pressure of the blocks 321, 322 is made uniform when the tire comes into contact with the ground. Furthermore, by the circumferential narrow grooves 323, 324 having a bent shape, the edge components of the second land portion 32 are increased and the snow performance of the tire is improved.

Moreover, in the configuration of FIG. 5, the circumferential narrow grooves 323, 324 are disposed in a central region (a region in a third of the block width) of the blocks 321, 322 in the tire lateral direction and divide the road contact surface of the blocks 321, 322 into roughly two equal parts. Additionally, the circumferential narrow grooves 323, 324 have a step-shaped bent portion with an amplitude in the tire lateral direction. The bent portion of the circumferential narrow grooves 323, 324 are disposed in a central portion of the blocks 321, 322 in the tire circumferential direction (a central portion when the blocks 321, 322 are divided into three equal parts in the tire circumferential direction). In this way, the rigidity of the blocks 321, 322 in the tire circumferential direction is made uniform.

Also, a groove width Ws of the circumferential narrow grooves 323, 324 is set such that the circumferential narrow grooves 323, 324 do not close at the contact surface between the tire and a flat plate when the tire is mounted on a specified rim, inflated to the specified internal pressure, placed vertically on the flat plate in a static state, and loaded with a load corresponding to the specified load. Specifically, the groove width Ws of the circumferential narrow grooves 323, 324 is set in the range of 1.5 mm≤Ws≤6.0 mm. Accordingly, the circumferential narrow grooves 323, 324 are appropriately open when the tire comes into contact with the ground, the blocks 321, 322 are divided, and the ground contact patch pressure of the blocks 321, 322 is appropriately made uniform. Also, edge components of the blocks 321, 322 are ensured by the circumferential narrow grooves 323, 324, and the traction characteristics of the tire is improved.

The groove width Ws of the circumferential narrow grooves 323, 324 is measured as the distance corresponding to the opening portion of the groove wall surface when the tire is mounted on a specified rim, inflated to the specified internal pressure, and in an unloaded state.

Furthermore, the circumferential narrow grooves 323, 324 adjacent in the tire circumferential direction open to the same through lug groove 421, 422 at different positions. In other words, the opening portions of the circumferential narrow grooves 323, 324 opposing each other on either side of the through lug groove 421, 422 are disposed at positions offset in the tire lateral direction. Thus, the opening portions of the adjacent circumferential narrow grooves 323, 324 are disposed in a dispersed manner in the tire lateral direction. Accordingly, the overall rigidity of the second land portion 32 is made uniform.

Note that in the configuration of FIG. 5, as described above, the circumferential narrow grooves 323, 324 include a step-shaped bent portion. However, no such limitation is intended, and the circumferential narrow grooves 323, 324 may have a straight shape, an arc shape, or a wave-like shape (not illustrated).

In addition, as illustrated in FIG. 5, the through lug grooves 421, 422 have a shape that increases in groove width toward the tire ground contact edge T (see FIG. 2). Additionally, groove widths Wg21_cl, Wg22_cl of the through lug grooves 421, 422 at the opening portions closer to the tire equatorial plane CL are narrower than groove widths Wg21_t, Wg22_t at the opening portions closer to the tire ground contact edge T. Accordingly, the rigidity of the blocks 321, 322 of the second land portion 32 in the region closer to the tire equatorial plane CL is ensured, and the uneven wear of the blocks 321, 322 is suppressed. Besides, the groove widths Wg21_cl, Wg22_cl of the through lug grooves 421, 422 adjacent in the tire circumferential direction at the opening portions closer to the tire equatorial plane CL are equal to each other (Wg21_cl=Wg22_cl), and the groove widths Wg21_t, Wg22_t at the opening portions closer to the tire ground contact edge T are equal to each other (Wg21_t=Wg22_t). Note that the groove widths may be different from each other (not illustrated).

Furthermore, in the configuration of FIG. 5, one of the groove walls of the through lug grooves 421, 422 of the second land portion 32 includes a step-shaped bent portion when the tread is seen in a plan view, and the other groove wall has a linear shape or an arc shape. Accordingly, the groove widths Wg21_cl, Wg21_t; Wg22_cl, Wg22_t of the left and right groove opening portions of the through lug grooves 421, 422 have a difference between each other. Moreover, by the groove walls of the through lug grooves 421, 422 including a step-shaped bent portion, the edge components of the lug grooves 421, 422 are increased, and traction characteristics are increased.

Additionally, by one of the groove walls of the through lug grooves 421, 422 being bent at the central portion of the second land portion 32, the left and right groove center line of the bent portion are offset in the tire circumferential direction at the central portion of the second land portion 32. Accordingly, offset amounts G1, G2 of the groove center lines of the through lug grooves 421, 422 in the tire circumferential direction preferably range from 2.0 mm to 12.0 mm.

Additionally, the bend directions of the groove center lines of the adjacent through lug grooves 421, 422 are opposite to each other with respect to the tire circumferential direction. Thus, the edge portion of the block 322 located between the bent portions of the adjacent through lug grooves 421, 422 has a greater width on the tire equatorial plane CL side and a lesser width on the tire ground contact edge T side. Accordingly, the portion of the block 322 with the smaller width due to the difference in the inclination angles of the through lug grooves 421, 422 (the portion of the block 322 divided by the circumferential narrow groove 324 closer to the tire equatorial plane CL) is given an appropriate length in the tire circumferential direction.

Note that in the configuration of FIG. 5, as described above, one of the groove walls of the through lug grooves 421, 422 of the second land portion 32 includes a step-shaped bent portion when the tread is seen in a plan view, and the other groove wall has a linear shape or an arc shape. However, no such limitation is intended, and as illustrated in the modified example of FIG. 6, both the left and right groove walls of the through lug grooves 421, 422 of the second land portion 32 may include a step-shaped bent portion.

Notch Portion and Chamfered Portion of Center Land Portion

In FIG. 3, the center land portion 31 includes a notch portion 313 only at the opening portion of the narrower through lug groove 411 and does not include a notch portion at the opening portion of the wider through lug groove 412. Besides, as illustrated in FIG. 4, the center land portion 31 includes a chamfered portion 314 on an edge portion of the notch portion 313. Accordingly, the drainage properties and the snow discharge properties of the narrower through lug groove 411 are ensured. Additionally, the groove volume of the narrower through lug groove 411 is supplemented by the notch portion 313 and the chamfered portion 314, and the rigidity of the center land portion 31 in the tire circumferential direction is made uniform.

The "notch portion 313" refers to the portion with a predetermined depth formed in the edge portion of the land portion 31. The notch portion 313 is for increasing the groove volume of the through lug groove 411 and includes a depth D2 which is greater than that of the chamfered portion 314 of the notch portion 313 or a chamfered portion (not illustrated) formed in the edge portion of the land portion 31. The depth D2 of the notch portion 313 is described below.

"Chamfered portion" refers to a flat surface (for example, a corner chamfer) or a curved surface (for example, a rounded chamfer) that connects the edge portion to an adjacent surface.

Furthermore, as illustrated in FIG. 3, the adjacent through lug grooves 421, 422 of the second land portion 32 have different inclination angles from each other, and the extension lines of the groove center lines of the through lug grooves 421, 422 meet at the edge portion of the center land portion 31. Additionally, the notch portion 313 of the center land portion 31 surrounds the extension lines of the groove center lines of the adjacent through lug grooves 421, 422. Moreover, the notch portion 313 includes a wall surface that bends in an L-shape or a V-shape to surround the extension lines of the groove center lines of a pair of the through lug grooves 421, 422. The chamfered portion 314 is formed along the bent notch portion 313.

Besides, the projecting side of the bent shape of the notch portion 313 faces the tire circumferential direction and inward in the width direction of the center land portion 31. In addition, one of the V-shaped notch portion 313 is formed across two of the blocks 311, 312 adjacent in the tire circumferential direction and crosses a single opening portion of the through lug groove 411, 412. In other words, the through lug groove 411, 412 communicates with the notch portion 313 and opens to the circumferential main groove 21 through the notch portion 313. Accordingly, a single notch portion 313 increases the width of the opening portion of the through lug groove 411, 412 left and right along the circumferential main groove 21.

Moreover, a plurality of the notch portions 313 are formed on the left and right edge portions of the center land portion 31. Furthermore, the narrower through lug groove 411 including the notch portions 313 at both left and right opening portions and the wider through lug groove 412 not including the notch portions 313 at either opening portion are alternately disposed in the tire circumferential direction. The through lug groove 412 not including the notch portion 313 is disposed separated from the notch portion 313 in the tire circumferential direction and opens to the circumferential main groove 21 without communicating with the notch portion 313.

Additionally, a crossing angle Φ1 (see FIG. 3) between the groove center line of the one through lug grooves 421 and the groove center line of the circumferential main groove 21 ranges from 50 degrees to 75 degrees, and a crossing angle Φ2 between the groove center line of the other through lug groove 422 and the circumferential main groove 21 ranges from 15 degrees to 40 degrees.

A bend angle of the notch portion 313 (dimension symbol omitted in the drawing) preferably ranges from 10 degrees to 70 degrees, and more preferably ranges from 15 degrees to 55 degrees. Thus, by the notch portion 313 having a bent shape with an acute angle projecting in the tire circumferential direction, as illustrated in FIG. 3, the notch portion 313 can surround the intersection portion of the extension lines along the extension lines of the groove center lines of the through lug grooves 421, 422 of the second land portion 32.

The bend angle of the notch portion 313 is measured along the profile line of the wall surface of the notch portion when the tread is seen in a plan view, when the tire is mounted on a specified rim, inflated to the specified internal pressure, and in an unloaded state. Note that the bend angle of the notch portion 313 is appropriately set depending on the pitch length of the tread pattern with a variable pitch structure.

Additionally, in FIG. 4, a maximum width W1 of the center land portion 31 and a maximum width W2 of the notch portion 313 preferably have the relationship of $0.05 \leq W2/W1 \leq 0.25$, and more preferably have the relationship of $0.10 \leq W2/W1 \leq 0.15$. This ensures the maximum width W2 of the notch portion 313, improves the drainage properties and the snow discharge properties of the narrower through lug groove 411, and suppresses a decrease in rigidity of the center land portion 31 caused by the notch portion 313 being excessively large.

The maximum width W1 of the land portion is the maximum value of the width of the road contact surface of the land portion in the tire axial direction measured when the tire is mounted on a specified rim, inflated to the specified internal pressure, and in an unloaded state (see FIG. 4).

The maximum width W2 of the notch portion is the maximum value of the width of the notch portion in the tire axial direction measured using the measurement point of the maximum width W1 of the land portion as a reference, when the tire is mounted on a specified rim, inflated to the specified internal pressure, and in an unloaded state (see FIG. 4).

Additionally, a maximum groove depth D1 (not illustrated) of the through lug groove 411 and a maximum groove depth D2 of the notch portion 313 (not illustrated) preferably have the relationship of $0.30 \leq D2/D1 \leq 1.00$ and more preferably have the relationship of $0.50 \leq D2/D1 \leq 0.80$. This ensures the maximum depth D2 of the notch portion 313, improves the drainage properties and the snow discharge properties of the through lug groove 411, and suppresses a decrease in rigidity of the land portion 31 caused by the notch portion 313 being excessively deep.

The maximum groove depth D1 of the lug groove is the maximum value of the distance from the tread contact surface to the groove bottom and is measured when the tire is mounted on a specified rim, inflated to the specified internal pressure, and in an unloaded state. Additionally, in configurations in which the lug grooves include a raised bottom portion or a sipe in parts on the groove bottom, the depth is measured excluding these portions.

The maximum depth D2 of the notch portion is the maximum value of the distance from the tread contact surface to the bottom portion and is measured when the tire is mounted on a specified rim, inflated to the specified internal pressure, and in an unloaded state. Additionally, in configurations in which the notch portions include a raised bottom portion or sipes on the groove bottom, the groove depth is measured excluding these portions.

Moreover, a maximum groove depth D0 (not illustrated) of the circumferential main groove 21 and the maximum groove depth D1 (not illustrated) of the through lug groove 411 of the center land portion 31 are preferably in the range of $0.6 \leq D1/D0 \leq 0.8$. Accordingly, the maximum groove depth D1 of the through lug groove 411 is made appropriate and the drainage properties of the lug groove 411 (412) is ensured.

Furthermore, in FIG. 4, the maximum width W2 of the notch portion 313 and a width W3 of the chamfered portion 314 preferably have the relationship of $0.20 \leq W3/W2 \leq 4.00$ and more preferably have the relationship of $0.30 \leq W3/W2 \leq 2.00$. The width W3 of the chamfered portion 314 is preferably in the range of 1.5 mm $\leq W3 \leq 6.0$ mm. Accordingly, the width W3 of the chamfered portion 314 is made appropriate.

The width W3 of the chamfered portion is the distance from the profile line of the notch portion to the tread contact surface when the tread is seen in a plan view and is measured when the tire is mounted on a specified rim, inflated to the specified internal pressure, and in an unloaded state (see FIG. 4).

Additionally, a depth D3 (not illustrated) of the chamfered portion 314 and the maximum depth D2 of the notch portion 313 (not illustrated) preferably have the relationship of $0.50 \leq D3/D2 \leq 0.80$. Besides, the depth D3 of the chamfered portion 314 is preferably in the range of 1.3 mm $\leq D3 \leq 5.5$ mm. Accordingly, the depth D3 of the chamfered portion 314 is made appropriate.

The depth D3 of the chamfered portion is the distance from the tread contact surface to a maximum depth position of the chamfered portion and is measured when the tire is mounted on a specified rim, inflated to the specified internal pressure, and in an unloaded state. The boundary between the notch portion and the chamfered portion is defined by the intersection between the extension line of the wall surface of the notch portion 313 closer to the bottom portion and the inclined surface of the chamfered portion 314 that connects with the road contact surface of the center land portion 31.

Non-Through Lug Groove of Shoulder Land Portion

Figure 7:
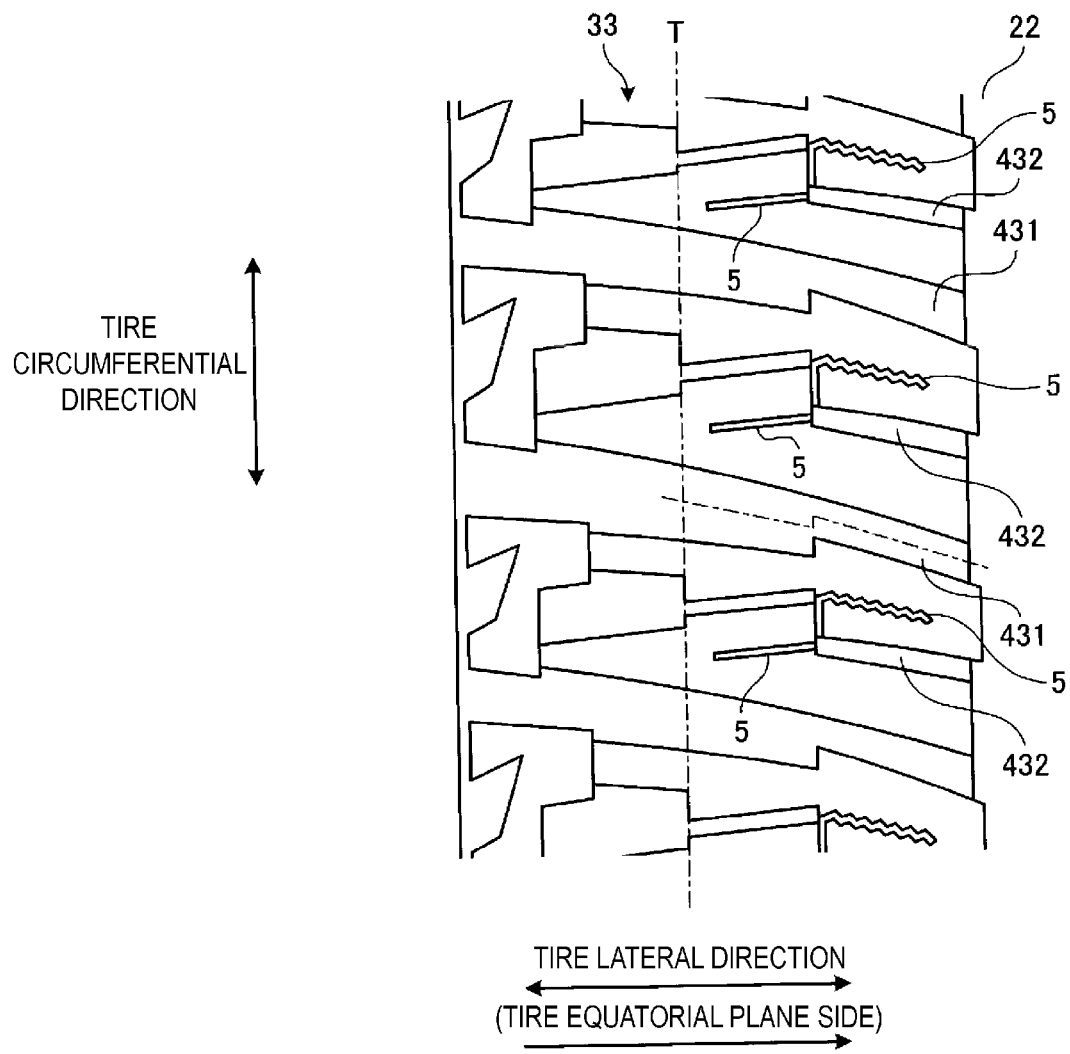
FIG. 7 is an enlarged view illustrating a shoulder land portion of the tread pattern illustrated in FIG. 2.

FIG. 7 is an enlarged view illustrating the shoulder land portion of the tread pattern illustrated in FIG. 2.

In the configuration of FIG. 2, as illustrated in FIG. 7, the shoulder land portion 33 includes the plurality of through lug grooves 431 described above and the plurality of non-through lug grooves 432.

The through lug grooves 431 open to the circumferential main groove 22 and the tire ground contact edge T extending through the shoulder land portion 33 in the tire lateral direction. For example, in the configuration of FIG. 7, the through lug grooves 431 have a shape that increases in groove width from the circumferential main groove 22 toward the tire ground contact edge T. Specifically, one of the groove walls of the through lug groove 431 includes a step-shaped bent portion when the tread is seen in a plan view, and the other groove wall has a linear shape or an arc shape. However, no such limitation is intended, and the left and right groove walls of the through lug groove 431 may have a linear shape or an arc shape. In addition, the groove depth of a narrow width portion of the through lug groove 431 closer to the circumferential main groove 22 preferably ranges from 30% to 80% of the groove depth of the broad width portion closer to the tire ground contact edge T. Accordingly, the snow discharge properties and the noise reduction effect of the through lug grooves 431 are ensured.

As illustrated in FIG. 7, the non-through lug groove 432 opens to the circumferential main groove 22 at one end portion and terminates within the contact patch of the shoulder land portion 33 at the other end portion.

Sipe

As illustrated in FIGS. 4, 5, and 7, the center land portion 31, the second land portions 32, and the shoulder land portions 33 are each provided with a plurality of sipes 5. The sipes 5 are classified as two-dimensional sipes (i.e., flat surface sipes) and three-dimensional sipes (i.e., 3D sipes). The sipes 5 ensure the edge components of the land portions 31 to 33 and improve the traction characteristics of the tire.

The two-dimensional sipe includes a straight-shaped sipe wall surface when viewed in a cross-section along a normal line direction of the sipe length direction (when viewed in a cross-section including the sipe width direction and the sipe depth direction). The two-dimensional sipe is only required to have a straight shape when viewed in a cross-section as described above, and in the sipe length direction may have a straight shape, a zigzag shape, a wave-like shape, an arc shape, or the like.

The three-dimensional sipe includes a bent-shaped sipe wall surface with amplitude in the sipe width direction when viewed in a cross-section along a normal line direction of the sipe length direction and also in a cross-section along a normal line direction of the sipe depth direction. Compared to the two-dimensional sipes, the three-dimensional sipes have a greater meshing force between opposing sipe wall faces and thus act to reinforce the rigidity of the land portions. The three-dimensional sipe is only required to have the structure described above at the sipe wall surface, and at the tread contact surface may have, for example, a straight shape, a zigzag shape, a wave-like shape, an arc shape, or the like. Below, examples of such three-dimensional sipes are given (see FIGS. 8 and 9).

Figure 8:
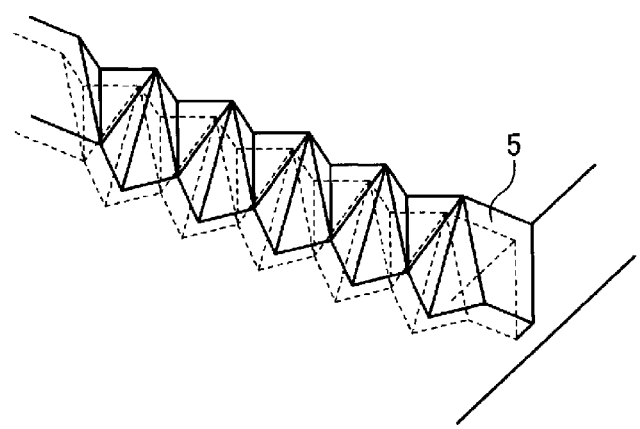
FIG. 8 is an explanatory diagram illustrating an example of a three-dimensional sipe.
Figure 9:
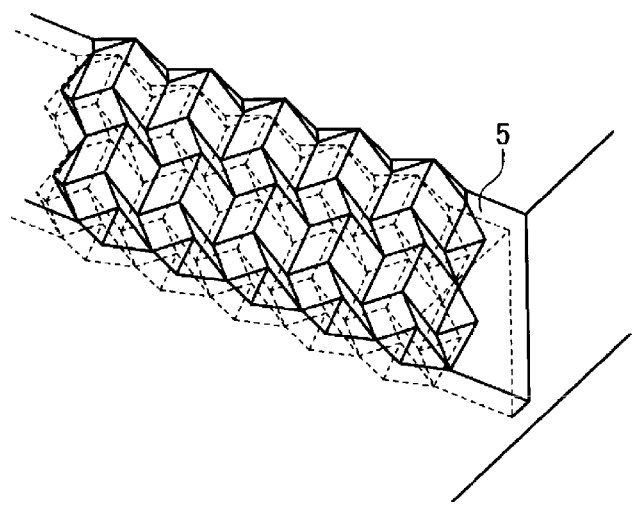
FIG. 9 is an explanatory diagram illustrating an example of a three-dimensional sipe.

FIGS. 8 and 9 are explanatory diagrams illustrating examples of the three-dimensional sipe. These drawings are perspective views of three-dimensional sipes including a pyramidal sipe wall surface.

In the configuration of FIG. 8, the sipe wall surface has a structure in which triangular pyramids and inverted triangular pyramids are connected in the sipe length direction. In other words, the sipe wall surface has a zigzag shape closer to the tread surface and a zigzag shape closer to the bottom portion with the pitch each being offset in the tire lateral direction, the two zigzag shapes together forming opposing ridges and grooves. Moreover, the ridges and grooves of the sipe wall surface, when viewed in the tire rotation direction, are formed by ridge lines between a protrusion inflection point closer to the tread surface and a recess inflection point closer to the bottom portion, a recess inflection point closer to the tread surface and a protrusion inflection point closer to the bottom portion, and a protrusion inflection point closer to the tread surface and a protrusion inflection point closer to the bottom portion adjacent to each other, with the flat surfaces between the ridge lines being connected in order in the tire lateral direction. Additionally, a first sipe wall surface has a ridged surface with convex triangular pyramids and inverted triangular pyramids arranged alternating in the tire lateral direction; and a second sipe wall surface has a ridged surface with concave triangular pyramids and inverted triangular pyramids arranged alternating in the tire lateral direction. Furthermore, the ridged surface of the sipe wall surface is oriented toward outside the blocks at at least the outer ends of the sipe. Note that examples of such a three-dimensional sipe include the known technology described in Japan Patent No. 3894743.

In the configuration of FIG. 9, the sipe wall surface has a structure in which a plurality of prism shapes having a block shape are connected in the sipe depth direction and the sipe length direction while inclining with respect to the sipe depth direction. In other words, the sipe wall face has a zigzag shape at the tread surface. Additionally, the sipe wall surface includes bent portions in at least two locations in the tire radial direction in the blocks that bend in the tire circumferential direction and are connected in the tire lateral direction. Moreover, these bent portions have a zigzag form with amplitude in the tire radial direction. Additionally, while, in the sipe wall surface, the amplitude is constant in the tire circumferential direction, an inclination angle in the tire circumferential direction with respect to a normal line direction of the tread surface is smaller at a portion on the sipe bottom side than at a portion on the tread surface side; and the amplitude in the tire radial direction of the bent portion is greater at a portion on the sipe bottom side than at a portion on the tread surface side. Note that examples of such a three-dimensional sipe include the known technology described in Japan Patent No. 4316452.

For example, in the configuration of FIG. 4, the blocks 311, 312 of the center land portion 31 each includes the plurality of sipes 5 and these sipes 5 are three-dimensional sipes. Furthermore, the sipe 5 terminate within the blocks 311, 312 at a first end portion and communicate with the circumferential main groove 21 opening at the edge portion of the blocks 311, 312 at a second end portion. In addition, the sipe 5 are inclined in the same direction as the through lug grooves 411 with respect to the tire circumferential direction and extend in the tire lateral direction crossing the center line of the center land portion 31 (in FIG. 4, the tire equatorial plane CL). Additionally, the sipes 5 and the through lug grooves 411, 412 are disposed parallel with each other and at equal intervals in the tire circumferential direction. This defines the blocks 311, 312 into rectangular regions of substantially equal width. Furthermore, in the blocks 311, 312 adjacent in the tire circumferential direction, the sipes 5 are inclined in the same direction with respect to the tire circumferential direction and open to the edge portions on different sides from each other.

In addition, the sipes 5 each open to the edge portion of the block 311 without communicating with the notch portion 313. Accordingly, the opening portions of the sipes 5 and the notch portions 313 are disposed offset from each other in the tire circumferential direction at the edge portion of the block 311. Accordingly, at the edge portion of the block 311, a distance g1 (dimension symbol omitted in the drawing) from the opening portion of the sipe 5 to the notch portion 313 is preferably in the range of 2.0 mm≤g1. This appropriately ensures the distance g1 from the opening portion of the sipe 5 to the notch portion 313.

Additionally, at least one of the sipes 5 extends through the chamfered portion 314 of the notch portion 313 and opens to the edge portion of the block 311. Specifically, as illustrated in FIG. 4, the notch portion 313 and the chamfered portion 314 have a V-shape projecting in the tire circumferential direction and extends across the two blocks 311, 312 passing through the through lug groove 411. Accordingly, in the block 311 including the notch portion 313 and the chamfered portion 314 with a V-shape, all of the sipes 5 are disposed separated from the notch portion 313 and the chamfered portion 314. On the other hand, in another block 311, at least one of the sipes 5 extends through the chamfered portion 314 and opens to the edge portion of the block 311.

Furthermore, as described above, a terminating end portion of the sipe 5 within the block 311 is disposed separated from the notch portion 313 and the chamfered portion 314. In such a configuration, the road contact surface of the block 311 extends continuously in the tire circumferential direction without being divided by the sipe 5, the notch portion 313 or the chamfered portion 314. Accordingly, the road contact surface of the block 311 is ensured. Here, a distance g2 (dimension symbol omitted in the drawing) from the terminating end portion of the sipe 5 to the chamfered portion 314 is preferably in the range of 2.0 mm≤g2. This appropriately ensures the distance g2 from the terminating end portion of the sipe 5 to the chamfered portion 314.

Note that in the configuration of FIG. 4, as described above, at least one of the sipes 5 extends through the chamfered portion 314 of the notch portion 313. However, no such limitation is intended, and all of the sipes 5 may be disposed separated from notch portion 313 and the chamfered portion 314. In this way, the rigidity of the center land portion 31 is ensured.

Moreover, in the configuration of FIG. 5, each of the blocks 321, 322 of the second land portion 32 includes the plurality of sipes 5 and these sipes 5 are three-dimensional sipes. Additionally, the sipe 5 terminates within the blocks 321, 322 at a first end portion and communicate with the circumferential main groove 21, 22 opening at the edge portion of the blocks 321, 322 at a second end portion. The sipe 5 are inclined in the same direction as the through lug grooves 421, 422 with respect to the tire circumferential direction and extend in the tire lateral direction. The sipes 5 and the through lug grooves 421, 422 are disposed parallel with each other and at equal intervals in the tire circumferential direction. This defines the blocks 321, 322 into rectangular regions of substantially equal width.

Moreover, the two types of through lug grooves 421, 422 of the second land portion 32 have inclination angles different from each other. Thus, the road contact surface of at least one of the blocks 322 is relatively narrower in the region closer to the tire equatorial plane CL defined by the circumferential narrow groove 324. As a result, the number of sipes in this region is lower than the number of sipes of other regions. In this way, the sipe density of the road contact surface of each of the blocks 321, 322 is made uniform.

Effects

As described above, the pneumatic tire 1 includes at least four circumferential main grooves 21, 22 extending in the tire circumferential direction and at least five land portions 31 to 33 defined by the circumferential main grooves 21, 22 (see FIG. 2). Additionally, the center land portion 31 and the left and right second land portions 32, 32 are each provided with the plurality of through lug grooves 411, 412; 421, 422 that are inclined at a predetermined inclination angle with respect to the tire lateral direction and extend through the land portions 31, 32 in the tire lateral direction (see FIG. 3). The through lug grooves 411, 412 located in the center land portion 31 and the through lug grooves 421, 422 located in the left and right second land portions 32 extend in the tire lateral direction inclined in opposite directions. Furthermore, at least one of the groove walls of the through lug grooves 421, 422 located in the left and right second land portions 32, 32 includes a step-shaped bent portion that bends in the tire circumferential direction when the tread is seen in a plan view.

In such a configuration, (1) the through lug grooves 411, 412 of the center land portion 31 and the through lug grooves 421, 422 of the left and right second land portions 32, 32 are inclined in opposite directions. This improves the traction characteristics on snowy road surfaces when the vehicle is turning. In addition, (2) the through lug grooves 421, 422 located in the left and right second land portions 32, 32 include a step-shaped bent portion. This increases the edge components of the through lug groove in the tread portion center region (see FIG. 2). This has the advantage of the snow performance of the tire being improved.

Moreover, in the pneumatic tire 1, the center land portion 31 and/or the left and right second land portions 32, 32 (in FIG. 3, all of the land portions 31, 32) are provided with the plurality of blocks 311, 312, 321, 322 defined by the plurality of through lug grooves 411, 412, 421, 422 (see FIG. 3). Additionally, the blocks 311, 312; 321, 322 adjacent in the tire circumferential direction have different shapes from each other. In such a configuration, the land portions 31, 32 of the tread portion center region are each provided with a block row including the plurality of types of blocks 311, 312; 321, 322. This reduces pattern noise dependent on the block shape when the tire rolls. This has an advantage that the noise performance of the tire (in particular, cabin noise performance) is improved.

Furthermore, in the pneumatic tire 1, the center land portion 31 and/or the left and right second land portions 32, 32 (in FIG. 3, both the center land portion 31 and the left and right second land portions 32, 32) are provided with the plurality of sets of the through lug grooves 411, 412; 421, 422, the through lug grooves 411, 412; 421, 422 in the sets being adjacent in the tire circumferential direction and having inclination angles different from each other (see FIG. 3). This has an advantage that pattern noise generated when the tire rolls is reduced, and the noise performance of the tire (in particular cabin noise performance) is improved.

Besides, in the pneumatic tire 1, the through lug grooves 411, 412 adjacent in the tire circumferential direction of the center land portion 31 have the groove widths Wg11, Wg12, which are different from each other (see FIG. 4). Additionally, the groove width Wg11 of the narrower through lug groove 411 and the groove width Wg12 of the wider through lug groove 412 have the relationship of 1.10≤Wg12/Wg11≤3.00. This has an advantage that the ratio Wg12/Wg11 of the groove widths Wg11, Wg12 of the adjacent through lug grooves 411, 412 is appropriately set. In other words, by satisfying 1.10≤Wg12/Wg11, the groove width ratio is ensured, and pattern noise when the tire rolls is reduced. Moreover, by satisfying Wg12/Wg11≤3.00, the uneven wear of the block caused by the groove width ratio being excessively large is suppressed.

Besides, in the pneumatic tire 1, the left and right groove walls of the through lug grooves 411, 412 of the center land portion 31 both include a step-shaped bent portion when the tread is seen in a plan view (see FIG. 4). Furthermore, one of the groove walls of the through lug grooves 421, 422 of the left and right second land portions 32, 32 includes a step-shaped bent portion when the tread is seen in a plan view, and the other groove wall has a linear shape or an arc shape (see FIG. 5). This has an advantage that the edge components of the through lug grooves are increased, and the snow performance of the tire is improved.

In addition, in the pneumatic tire 1, the left and right groove walls of the through lug grooves 411, 412, 421, 422 of the center land portion 31 and the left and right second land portions 32, 32 include a step-shaped bent portion when the tread is seen in a plan view (see FIGS. 4 and 6). This has an advantage that the edge components of the through lug grooves are increased, and the snow performance of the tire is improved.

Moreover, in the pneumatic tire 1, the opening portions to the circumferential main groove 21 of the through lug grooves 411, 412 of the center land portion 31 and the opening portions of the through lug grooves 421, 422 of the second land portion 32 are disposed offset from each other in the tire circumferential direction (see FIG. 3). This has an advantage that pattern noise generated when the tire rolls is reduced more than in a configuration in which the opening portions of the lug grooves of the left and right land portions are opposite each other (not illustrated).

Besides, in the pneumatic tire 1, the through lug grooves 411, 412 adjacent in the tire circumferential direction of the center land portion 31 have the groove widths Wg11, Wg12, which are different from each other (see FIG. 4). Additionally, the center land portion 31 includes the notch portion 313 only at the opening portion of the narrower through lug groove 411 and does not include the notch portion 313 at the opening portion of the wider through lug groove 412. This has an advantage that the drainage properties and the snow discharge properties of the narrower through lug groove 411 are ensured.

Furthermore, in the pneumatic tire 1, the center land portion 31 includes the chamfered portion 314 on the edge portion of the notch portion 313 (see FIG. 4). This has an advantage that the drainage properties and the snow discharge properties of the narrower through lug groove 411 are improved.

Additionally, in the pneumatic tire 1, the adjacent through lug grooves 421, 422 of the second land portion 32 have inclination angles different from each other (see FIG. 3). Moreover, the extension lines of the groove center lines of the adjacent through lug grooves 421, 422 of the second land portion 32 meet at the edge portion of the center land portion 31. Additionally, the notch portion 313 of the center land portion 31 surrounds the extension lines of the groove center lines of the adjacent through lug grooves 421, 422 of the second land portion 32. In such a configuration, a drainage passage is formed from the notch portion 313 of the center land portion 31, through the lug grooves 421, 422 of the second land portion 32, to the circumferential main groove 22 closer to the tire ground contact edge T of the second land portion 32. This has an advantage that the drainage properties of the tread portion center region are improved, and the wet performance of the tire is improved.

Besides, in the pneumatic tire 1, the second land portion 32 includes the plurality of blocks 321, 322 defined by the plurality of through lug grooves 421, 422 (see FIG. 5). In addition, the plurality of blocks 321, 322 have a bent shape with an amplitude in the tire lateral direction and include circumferential narrow grooves 323, 324 that extend through the blocks 321, 322 in the tire circumferential direction. In such a configuration, the rigidity of the blocks 321, 322 in the tire lateral direction is alleviated by the circumferential narrow grooves 323, 324. This has an advantage that the ground contact patch pressure of the blocks 321, 322 when the tire comes into contact with the ground is reduced, and the uneven wear of the blocks 321, 322 is suppressed. Additionally, there is an advantage that the circumferential narrow grooves 323, 324 increase the edge components of the blocks 321, 322, and the snow performance of the tire improves.

Furthermore, in the pneumatic tire 1, the left and right shoulder land portions 33 are each provided with the plurality of through lug grooves 431 that are inclined at a predetermined inclination angle with respect to the tire lateral direction and extend through the land portions 33 in the tire lateral direction (see FIG. 2). Moreover, the through lug grooves 431 located in the left and right shoulder land portions 33 and the through lug grooves 421, 422 located in the left and right second land portions 32 extend in the tire lateral direction inclined in opposite directions. In such a configuration, the through lug grooves 431 of the left and right shoulder land portions 33, 33 and the through lug grooves 421, 422 of the left and right second land portions 32, 32 are inclined in opposite directions. This improves the traction characteristics on snowy road surfaces when the vehicle is turning. This has the advantage of the tire snow performance being improved.

Besides, in the pneumatic tire 1, at least one of the groove walls (both in FIG. 7) of the through lug groove 431 of the shoulder land portion 33 includes a step-shaped bent portion that bends in the tire circumferential direction when the tread is seen in a plan view (see FIG. 7). This has an advantage that the edge components of the through lug grooves 431 are increased, and the snow performance of the tire is improved.

Furthermore, in the pneumatic tire 1, the opening portions to the circumferential main groove 22 of the through lug grooves 431 of the shoulder land portion 33 and the opening portions of the through lug grooves 421, 422 of the second land portion 32 are disposed offset from each other in the tire circumferential direction (see FIG. 2). This has an advantage that pattern noise generated when the tire rolls is reduced more than in a configuration in which the opening portions of the lug grooves of the left and right land portions are opposite each other (not illustrated). In particular, the arrangement structure of the through lug grooves 421, 422, 431 that open to the outermost circumferential main groove 22 greatly affects the pattern noise.

EXAMPLES

FIGS. 10A-10B include a table showing the results of performance tests of pneumatic tires according to embodiments of the technology.

In the performance tests, a plurality of different test tires were evaluated for (1) snow performance and (2) noise performance. Additionally, test tires having a tire size of 265/65R17 112H were mounted on rims having a rim size of 17×8 J, inflated to an air pressure of 230 kPa, and loaded with the maximum load defined by JATMA. Moreover, the test tires were then mounted on all of the wheels of the test vehicle which was a four wheel drive recreational vehicle (RV) with an engine displacement of 3.5 L.

(1) In the snow performance evaluation, the test vehicle was driven at a speed of 40 km/h on a predetermined handling course that is a snowy road, and a sensory evaluation on steering stability was conducted by a test driver. Results of the evaluation are expressed as index values and evaluated with the Conventional Example being assigned as the reference (100). In this evaluation, larger values are preferable.

(2) In the noise performance evaluation, the test vehicle was driven at a speed of 60 km/h on a test course with a rough road surface, and the sound pressure level of the cabin noise (pattern noise) was measured via a microphone attached at a position on the window side of the driver seat. The results are expressed as index values and evaluated with the Conventional Example being assigned as the reference (100). In this evaluation, larger numbers indicate lower sound pressure levels and are more preferable.

The test tires of Examples 1 to 12 basically have the configuration of FIGS. 1 and 2 and include four circumferential main grooves 21, 22 and five land portions 31 to 33. In addition, the land portions 31 to 33 each include the plurality of through lug grooves 411, 412, 421, 422, 431 bent in a Z-shape or a crank-like shape, and block rows defined by the through lug grooves. Furthermore, the groove depth of the circumferential main grooves is 10.0 mm, and the maximum groove depth of the through lug grooves 411, 412, 421, 422, 431 is 7.0 mm. Besides, the groove width Ws of the circumferential narrow grooves 323, 324 of the second land portion 32 is 2.0 mm, and the groove depth is 5.0 mm. The offset amounts G1, G2 (see FIG. 5) of the groove center lines of the through lug grooves 421, 422 of the second land portion 32 are G1=G2=6.0 mm. Additionally, in Example 11, the center land portion 31 includes the notch portion 313, and as illustrated in FIG. 2, the extension lines of the through lug grooves 421, 422 of the second land portion 32 meet at the notch portion of the center land portion 31. Moreover, in Example 12, the shoulder land portions 33 include the through lug groove 431 and the non-through lug groove 432. Note that in FIGS. 10A-10B, "CE" denotes the center land portion 31, "2nd" denotes the left and right second land portions 32, 32, and "SH" denotes the left and right shoulder land portions 33, 33.

The test tire of the Conventional Example has the same configuration as the test tire of Example 1 except that the land portions of the former all include a single type of through lug groove, and the through lug grooves have a linear shape or an arc shape.

As can be seen from the test results, the snow performance and the noise performance are improved in the test tires of Examples 1 to 12.

The invention claimed is:

1. A pneumatic tire, comprising:
at least four circumferential main grooves that extend in a tire circumferential direction; and
at least five land portions defined by the circumferential main grooves;
the land portions comprising land portions located outermost in a tire lateral direction on left and right sides defined as shoulder land portions, land portions located second from outside in the tire lateral direction on left and right sides defined as second land portions, and a land portion located closer to a tire equatorial plane than the second land portions defined as a center land portion;
the center land portion and the left and right second land portions each comprising a plurality of through lug grooves that are inclined at a predetermined inclination angle with respect to the tire lateral direction and extend through the land portion in the tire lateral direction;
the plurality of through lug grooves located in the center land portion and the plurality of through lug grooves located in the left and right second land portions extending in the tire lateral direction inclined in opposite directions to each other;
at least one groove wall of each of the plurality of through lug grooves located in the left and right second land portions comprising a step-shaped bent portion that bends in the tire circumferential direction in a plan view of a tread;
the left and right second land portions each comprising first and second blocks defined by the plurality of through lug grooves, the first and second blocks having different shapes and being arranged alternately in the tire circumferential direction;
the plurality of blocks each comprising a circumferential narrow groove that has a bent portion with amplitude in the tire lateral direction and extends through the block in the tire circumferential direction; and
the circumferential narrow groove opening to the adjacent through lug grooves respectively.

2. The pneumatic tire according to claim 1, wherein the center land portion and/or the left and right second land portions comprise the plurality of through lug grooves in a plurality of sets, through lug grooves of each of the plurality of sets being adjacent in the tire circumferential direction and having inclination angles different from each other.

3. The pneumatic tire according to claim 1, wherein a pair of the plurality of through lug grooves adjacent in the tire circumferential direction of the center land portion have groove widths different from each other, and a groove width Wg11 of a narrower through lug groove of the pair of the plurality of through lug grooves and a groove width Wg12 of a wider through lug groove have a relationship of $1.10 \leq Wg12/Wg11 \leq 3.00$.

4. The pneumatic tire according to claim 1, wherein
each of left and right groove walls of each of the plurality of through lug grooves of the center land portion comprises a step-shaped bent portion when the tread is seen in a plan view; and
one of groove walls of each of the plurality of through lug grooves of the left and right second land portions comprises a step-shaped bent portion when the tread is seen in a plan view and the other groove wall has a linear shape or an arc shape.

5. The pneumatic tire according to claim 1, wherein each of left and right groove walls of each of the plurality of through lug grooves of the center land portion and the left and right second land portions comprises a step-shaped bent portion when the tread is seen in a plan view.

6. The pneumatic tire according to claim 1, wherein opening portions, open to one of the circumferential main grooves, of the plurality of through lug groove of the center land portion and opening portions of the plurality of through lug grooves of the second land portions are disposed offset from each other in the tire circumferential direction.

7. The pneumatic tire according to claim 1, wherein
a pair of the plurality of through lug grooves adjacent in the tire circumferential direction of the center land portion have groove widths different from each other; and
the center land portion comprises a notch portion only at an opening portion of the narrower through lug groove, and does not comprise the notch portion at an opening portion of the wider through lug groove.

8. The pneumatic tire according to claim 7, wherein the center land portion comprises a chamfered portion on an edge portion of the notch portion.

9. The pneumatic tire according to claim 7, wherein
an adjacent pair of the plurality of through lug grooves of the second land portions have the inclination angles different from each other;
extension lines of groove center lines of the adjacent pair meet at an edge portion of the center land portion; and
the notch portion of the center land portion surrounds the extension lines of the groove center lines of the adjacent pair.

10. The pneumatic tire according to claim 1, wherein
the left and right shoulder land portions each comprise a plurality of through lug grooves that are inclined at a predetermined inclination angle with respect to the tire lateral direction, the plurality of through lug grooves extend through the shoulder land portion in the tire lateral direction; and
the plurality of through lug grooves located in the left and right shoulder land portions and the plurality of through lug grooves located in the left and right second land portions extend in the tire lateral direction inclined in opposite directions to each other.

11. The pneumatic tire according to claim 10, wherein at least one of groove walls of each of the plurality of through lug grooves of the shoulder land portions comprise a step-shaped bent portion that bends in the tire circumferential direction when the tread is seen in a plan view.

12. The pneumatic tire according to claim 1, wherein opening portions, open to one of the circumferential main grooves, of the plurality of through lug grooves of the shoulder land portions and opening portions of the plurality of through lug grooves of the second land portions are disposed offset from each other in the tire circumferential direction.

13. The pneumatic tire according to claim 1, wherein the plurality of through lug grooves of the left and right second land portions are composed of first and second through lug grooves, and the first and second through lug grooves have inclination angles different from each other and are arranged alternately in the tire circumferential direction.

14. The pneumatic tire according to claim 1, wherein the blocks of the second land portions include a single circumferential narrow groove, the circumferential narrow grooves extend through the blocks in the tire circumferential direction and open to the adjacent through lug grooves respectively.

15. A pneumatic tire, comprising:
at least four circumferential main grooves that extend in a tire circumferential direction; and
at least five land portions defined by the circumferential main grooves;
the land portions comprising land portions located outermost in a tire lateral direction on left and right sides defined as shoulder land portions, land portions located second from outside in the tire lateral direction on left and right sides defined as second land portions, and a land portion located closer to a tire equatorial plane than the second land portions defined as a center land portion;
the center land portion and the left and right second land portions each comprising a plurality of through lug grooves that are inclined at a predetermined inclination angle with respect to the tire lateral direction and extend through the land portion in the tire lateral direction;
the plurality of through lug grooves located in the center land portion and the plurality of through lug grooves located in the left and right second land portions extending in the tire lateral direction inclined in opposite directions to each other;
at least one groove wall of each of the plurality of through lug grooves located in the left and right second land portions comprising a step-shaped bent portion that bends in the tire circumferential direction in a plan view of a tread;
the plurality of through lug grooves of the left and right second land portions being composed of first and second through lug grooves, and the first and second through lug grooves having inclination angles different from each other and being inclined in a same direction with respect to the tire lateral direction;
the left and right shoulder land portions each comprising a plurality of through lug grooves that are inclined at a predetermined inclination angle with respect to the tire lateral direction, the plurality of through lug grooves extending through the shoulder land portion in the tire lateral direction; and
the plurality of through lug grooves located in the left and right shoulder land portions and the plurality of through lug grooves located in the left and right second land portions extending in the tire lateral direction inclined in opposite directions to each other.

16. The pneumatic tire according to claim 15, wherein a pair of the plurality of through lug grooves adjacent in the tire circumferential direction of the center land portion have groove widths different from each other, and a groove width $Wg11$ of a narrower through lug groove of the pair of the plurality of through lug grooves and a groove width $Wg12$ of a wider through lug groove have a relationship of $1.10 \leq Wg12/Wg11 \leq 3.00$.

17. A pneumatic tire, comprising:
at least four circumferential main grooves that extend in a tire circumferential direction; and
at least five land portions defined by the circumferential main grooves;
the land portions comprising land portions located outermost in a tire lateral direction on left and right sides defined as shoulder land portions, land portions located second from outside in the tire lateral direction on left and right sides defined as second land portions, and a land portion located closer to a tire equatorial plane than the second land portions defined as a center land portion;
the center land portion and the left and right second land portions each comprising a plurality of through lug grooves that are inclined at a predetermined inclination angle with respect to the tire lateral direction and extend through the land portion in the tire lateral direction;
the plurality of through lug grooves located in the center land portion and the plurality of through lug grooves located in the left and right second land portions extending in the tire lateral direction inclined in opposite directions to each other;
at least one groove wall of each of the plurality of through lug grooves located in the left and right second land portions comprising a step-shaped bent portion that bends in the tire circumferential direction in a plan view of a tread;
a pair of the plurality of through lug grooves adjacent in the tire circumferential direction of the center land portion having groove widths different from each other and being inclined in a same direction with respect to the tire lateral direction, a groove width $Wg11$ of a narrower through lug groove of the pair of the plurality of through lug grooves and a groove width $Wg12$ of a wider through lug groove having a relationship of $1.10 \leq Wg12/Wg11 \leq 3.00$;
the center land portion comprising a notch portion only at an opening portion of the narrower through lug groove, and the center land portion not comprising the notch portion at an opening portion of the wider through lug groove;
an adjacent pair of the plurality of through lug grooves of the second land portions having the inclination angles different from each other;
extension lines of groove center lines of the adjacent pair meeting at an edge portion of the center land portion; and
the notch portion of the center land portion surrounding the extension lines of the groove center lines of the adjacent pair.

18. The pneumatic tire according to claim 17, wherein an inclination angle $\theta 11$ of the narrower through lug groove is greater than an inclination angle $\theta 12$ of the wider through lug groove.

19. The pneumatic tire according to claim 1, wherein the circumferential narrow grooves adjacent in the tire circumferential direction open to the same through lug groove at different positions.

20. The pneumatic tire according to claim 15, wherein the through lug grooves have a shape that increases in groove width from the circumferential main groove toward a tire ground contact edge, and one groove wall of the through lug groove includes a step-shaped bent portion when the tread is seen in a plan view.

21. The pneumatic tire according to claim 17, wherein the notch portion includes a wall surface that bends in an L-shape or a V-shape to surround extension lines of groove center lines of a pair of the through lug grooves.

* * * * *